United States Patent
Tiemann et al.

[11] Patent Number: 6,028,883
[45] Date of Patent: Feb. 22, 2000

[54] LOW POWER SIGNAL PROCESSING FOR SPREAD SPECTRUM RECEIVERS

[75] Inventors: Jerome Johnson Tiemann, Schenectady; Daniel David Harrison, Delanson, both of N.Y.

[73] Assignee: General Electric Company, Schenectady, N.Y.

[21] Appl. No.: 08/883,162

[22] Filed: Jun. 26, 1997

Related U.S. Application Data

[60] Provisional application No. 60/021,628, Jul. 12, 1996.

[51] Int. Cl.$^7$ .................................................. H04B 15/00
[52] U.S. Cl. ......................... 375/200; 370/320; 370/335; 375/206
[58] Field of Search ..................................... 370/320, 335, 370/342, 350; 375/200, 206, 208, 209, 210; 342/357, 701

[56] References Cited

U.S. PATENT DOCUMENTS

| | | | |
|---|---|---|---|
| 4,426,712 | 1/1984 | Gorski-Popiel | 375/96 |
| 4,894,842 | 1/1990 | Broekhoven et al. | 375/1 |
| 4,910,752 | 3/1990 | Yester, Jr. et al. | 375/75 |
| 4,998,111 | 3/1991 | Ma et al. | 342/352 |
| 5,329,549 | 7/1994 | Kawasaki | 375/1 |
| 5,420,593 | 5/1995 | Niles | 342/357 |
| 5,448,773 | 9/1995 | McBurney et al. | 455/343 |
| 5,781,156 | 7/1998 | Krasner | 342/357 |
| 5,872,810 | 2/1999 | Philips et al. | 375/222 |

*Primary Examiner*—Michael Horabik
*Assistant Examiner*—Binyam Tadesse
*Attorney, Agent, or Firm*—Marvin Snyder; Douglas E. Stoner

[57] ABSTRACT

A direct sequence spread spectrum architecture permits low power consumption during a synchronization phase of data reception by allowing the receiver to be turned off during most of the acquisition phase of reception, or by using a parallel correlator to keep acquisition time short. The architecture is particularly suitable for global positioning satellite (GPS) signal processing and permits multiple satellite codes and multiple Doppler bins to be searched either sequentially, without requiring the receiver to be turned on during the search process. The receiver output baseband data is sampled and stored over a time interval sufficient to achieve acquisition and synchronization for any one code division multiple access (CDMA) signal at any specific Doppler shift. This sample is digitally recorded and re-played from memory as many times as may be required to acquire and synchronize each desired CDMA signal. To keep processing energy consumption low, an analog (capacitor-based) cross-correlator is used. The order of coherent and non-coherent processing for all code-Doppler channels is chosen to maximize energy efficiency while minimizing required processor hardware.

18 Claims, 19 Drawing Sheets

LOW POWER SIGNAL PROCESSING FOR SPREAD SPECTRUM RECEIVERS

CROSS-REFERENCE TO RELATED APPLICATION

This application claims the benefit of U.S. Provisional Application Ser. No. 60/021,628, filed Jul. 12, 1996.

This application discloses subject matter related to that of application Ser. No. 08/456,229 filed on May 31, 1995, now U.S. Pat. No. 5,752,218, issued May 12, 1998 by Daniel D. Harrison, Anantha K. Pradeep, Glen W. Brooksby and Stephen M. Hladik for "A Reduced-Power GPS-Based System for Tracking Multiple Objects from a Central Location" and assigned to the assignee of this application. The disclosure of U.S. Pat. No. 5,752,218 is incorporated herein by reference.

This application is related to applications Ser. Nos. 08/883,161 (now U.S. Pat. No. 5,896,304); 08/883,163; 08/883,421; 08/883,420; 08/883,419; 08/883,159; 08/883,160 filed concurrently herewith and assigned to the assignee of this application.

BACKGROUND OF THE INVENTION

1. Field of the Invention

This invention generally relates to spread spectrum communications systems and, more particularly, to a low-power signal processing architecture and method for spread spectrum receivers.

2. Background Description

Spread spectrum communication is advantageous in communication applications requiring high reliability in a noisy environment. Often the dominant noise is man-made interference, either intentional or accidental. In a specific application the communication environment may include many potential reflectors, giving rise to severe multi-path interference. Such multi-path interference typically insinuates deep nulls in the form of frequency selective fading. Spread spectrum communications is an excellent countermeasure to these difficulties.

There are several types of spread spectrum systems including direct sequence spread spectrum systems, frequency hopping systems, time hopping systems, pulse frequency modulated (or chirp) systems, and various hybrids. Of these, the direct sequence spread spectrum (DSSS) systems and frequency hopping systems are perhaps the more widely implemented. The following discussion is focused on binary DSSS systems.

In binary DSSS communication, a wide band carrier signal is modulated by a narrow band message signal. The wide-band carrier is typically generated by bi-phase modulating a single frequency carrier using a binary pseudo-random noise (P/N) code sequence. The P/N code is often generated using one or more high speed shift registers, each having modulo-two feedback according to a primitive polynomial. The generated high-speed P/N code is then applied to a balanced modulator (multiplier) whose other input signal is the narrow band carrier. The output signal of the balanced modulator is a wide-band signal often referred to as a "wide-band carrier". To communicate data, the wide-band carrier is bi-phase modulated by a binary message data stream. The message data rate is usually much lower than the P/N-code symbol or "chip" rate, and the data and code-chip edges are usually synchronized. The ability of the DSSS technique to suppress interference is directly proportional to the ratio of the code-chip rate to the data rate. In many applications, there are thousands of code chips per message bit.

A DSSS signal can be received by first shifting the signal down to baseband by multiplying it with a locally generated replica of the original narrow-band carrier (e.g., a properly tuned local oscillator). If the frequency (and phase) of the carrier replica is the same as that of the received original narrow-band carrier, then the multiplier output signal will be a bipolar "wide-band data" stream that is the product of the bipolar P/N code and message-data sequences. The P/N code is then removed by multiplying the wide-band data stream with a locally generated replica of the P/N code that is time aligned with the received P/N code. This is the data de-spreading process and yields the original message data stream at the multiplier output.

In the data de-spreading process, the wide-band data power spectrum is refocused into the original narrower data bandwidth, raising the data power level well above the background noise in that bandwidth. The amount that the power level is raised is the so called processing gain and is directly proportional to the ratio of the code rate to the data rate. Furthermore, any received narrow-band interference is spread by the code-replica modulation, and this greatly reduces the interference power level in the data band.

An often difficult task associated with DSSS signal reception is that of generating the carrier replica with both proper carrier frequency and phase and generating the P/N code replica at the proper rate and with proper time alignment (offset). In many DSSS communication systems, the necessary carrier frequency, carrier phase, and P/N code offset are not known a priori at the receiver and these parameters must be determined by trying different values until a large signal is observed at the data-filter output. This is known as the search or acquisition process, and a DSSS signal is said to be acquired when the proper frequency, phase, and code offset have been determined.

In many DSSS applications, the DSSS signal levels are well below the background noise and/or interference levels and are not detectable until properly de-spread and low-pass filtered. When the received signal-to-noise ratio (SNR) is very low, the filter must be very narrow to achieve the processing gain needed for signal detection and acquisition. Because a narrow filter requires a long integration period, the result of multiplying many received P/N code samples by the corresponding replica P/N code samples must be accumulated before the detection decision can be made. This multiplication and accumulation is a cross correlation between the received and replica P/N code sequences, and the sequences may have to be long for low SNR signals.

Use of the DSSS method enables multiple users to simultaneously share the same wide-band channel using the code-division multiple access (CDMA) technique. With this technique, each transmitter utilizes a different P/N code such that the cross correlation between different codes is substantially zero. A receiver selects and detects a particular transmitted signal by choosing the appropriate P/N code and performing the acquisition search. In some cases, it is unknown which transmitter may be transmitting and the acquisition search must include examination of different P/N codes from a known list. When many different codes, code offsets and carrier frequencies must be examined and the SNR is low, the acquisition task can be both time and energy consuming. An important aspect of the present invention is the reduction of the time and energy consumed in the DSSS signal acquisition process.

A description of direct sequence and other types of spread spectrum communications systems may be found, for example, in Spread Spectrum Systems, $3^{rd}$ Ed., by Robert C.

Dixon, John Wiley & Sons (1994), and Spread Spectrum Communications, Vol. II, by M. K. Simon et al., Computer Science Press (1985). A description of CDMA techniques may be found, for example, in CDMA Principles of Spread Spectrum Communication, by Andrew J. Viterbi, Addison-Wesley (1995).

The popular and ubiquitous Global-Positioning System signals are an important application of DSSS communications. In recent years, Navstar Global-Positioning System (GPS) satellites have been launched into medium-altitude earth orbits in six orbital planes, each tipped 55° with respect to the equator. The complete GPS satellite constellation comprises twenty-one satellites and several spares. Signals transmitted from these satellites allow a receiver near the ground to accurately determine time and its own position. Each satellite transmits data that provides precise knowledge of the satellite position and allows measurement of the distance from that satellite to the antenna of the user's receiver. With this information from at least four GPS satellites, the user can compute its own position, velocity and time parameters through known triangulation techniques (i.e., the navigation solution). Typically, seven, but a minimum of four, satellites are observable by a user anywhere on or near the earth's surface if the user's receiver has an unobstructed view of the sky, down to very near the horizon. Each satellite transmits signals on two frequencies known as L1 (1575.42 MHz) and L2 (1227.6 MHz), and all satellites share these frequencies using the CDMA DSSS techniques described earlier.

More particularly, each satellite transmits a single high-resolution DSSS signal on frequency L2 and the same signal plus another lower-resolution DSSS signal on frequency L1. The low-resolution DSSS signal comprises a P/N code with a 1.023 MHZ chipping rate and a 1.0 ms repetition period, and a message data sequence (the NAV data) with a rate of 50 bits per second. The high-resolution DSSS signal uses a P/N code with a 10.23 MHz chipping rate and a repetition period longer than a week. The same NAV data stream is used in all DSSS signals from a given satellite. The NAV message from a given satellite contains the GPS signal transmission time, ephemeris (position) data for that satellite, almanac data (a reduced accuracy ephemeris) for all of the satellites in the constellation, and a hand-over word used in connection with the transition from low-resolution to high-resolution code tracking. The low and high-resolution codes are known as the course/acquisition (C/A) and precise (P) codes, respectively.

After acquisition, the offset of each code, together with the signal-transmission time from the NAV data, enables a receiver to determine the range between the corresponding satellite and the user. By including both the P code and the repeating C/A code in the transmitted signal, a more-rapid hierarchical acquisition of the P code is made possible and a two tiered level of global navigation service can be provided. The P code can provide positions that are accurate to approximately 3 meters, while the C/A code yields accuracies on the order of 30 meters. Typically, the low-resolution service is unrestricted while the high-resolution service is restricted to the military by encrypting or otherwise controlling knowledge of the high-resolution P/N code.

In a typical military receiver, the C/A code is acquired first. Then the hand-over word is read from the NAV data stream. The hand-over word specifies the approximate offset of the P code relative to GPS time (as transmitted in the time stamp), and its use will dramatically reduce the number of different code offsets that must be searched during the P code acquisition. Acquisition of the C/A code is substantially easier than direct acquisition of the P code because the C/A code repeats every 1.0 ms and there are, therefore, only 1023 different code offsets to search (twice this if the search is performed in the usual half-chip steps).

Received GPS signals are usually shifted in frequency from the nominal L1 and L2 carrier frequencies because the GPS satellites move in orbit at several kilometers per second, yielding a substantial Doppler shift. The satellite trajectories are usually known a priori and the Doppler shifted carrier frequencies are therefore predictable if the GPS receiver location is known. Unfortunately, the receiver location is not known a priori, and there is often substantial local oscillator error with inexpensive receivers. The resulting uncertainty in received carrier frequency (i.e., in needed replica carrier frequency) can be large (e.g., ±7.5 kHz), and this frequency range may have to be searched during the GPS signal-acquisition process. The frequency or Doppler search is usually done by repeating the cross correlation of the received sample and local replica P/N sequences for different local oscillator (carrier replica) frequencies. The spacing between frequency steps is made small enough to avoid missing the signal when long cross-correlation integration times (narrow filter bandwidths) are used. Long integration times improve detection of low SNR signals. With typical civilian GPS applications, 1.0 millisecond cross-correlation integrations are used (a single C/A code cycle), yielding an equivalent Doppler filter bandwidth of approximately 500 Hz. A ±7.5 kHz frequency range can be searched with thirty 500 Hz steps. The GPS acquisition then entails a search over satellite code, code offset, and Doppler frequency.

A master control station (MCS) and a number of monitor stations comprise the control portion of the GPS system. The monitor stations passively track all GPS satellites in view, collecting ranging data and satellite clock data from each satellite. This information is passed to the MCS where the satellites' future ephemeris and clock drift are predicted. Updated ephemeris and clock data are uploaded to each satellite for re-transmission in each satellite's NAV message.

In operation, a typical GPS receiver performs the following for each of at least four satellite signals:

1) acquires the DSSS signal,
2) synchronizes with the NAV data stream and reads the satellite time-stamp, clock-correction, ionospheric-delay and ephemeris data,
3) calculates the satellite position from the ephemeris data,
4) reads its own receiver clock to determine the receiver time associated with the reception of the time-stamp epoch, and
5) estimates the signal travel time by subtracting the time-stamp value from the associated receiver time. This time difference is multiplied by the speed of light to obtain an estimated range to the satellite. If the GPS receiver had a clock that was perfectly synchronized with the clocks of the satellites (or the error was known), only three such range estimates would be required to precisely locate the receiver. There is, however, a clock-bias (slowly changing error) due the fact that GPS receivers typically use inexpensive crystal clocks, whereas the satellites are equipped with atomic clocks. This clock bias is learned and its effect eliminated by measuring the range (travel time) from four GPS satellites and using these measurements in a system of four equations with four unknowns (receiver x, y, and z, and time). For general information on GPS, the reader is referred to the book by Tom Logsdon entitled The Navstar Global Positioning System, by Van Nostrand Reinhold (1992).

A preferred application of the present invention is the locating and tracking of assets such as rail cars, shipping or cargo containers, trucks, truck trailers, and the like, using the GPS. In this application, the GPS receivers are usually battery powered since an independent source of power is generally not available. It is advantageous to increase the operating life of the batteries by reducing energy consumed by the GPS receiver.

In a typical spread spectrum receiver, the receiver front end (i.e., RF and IF electronics) consumes a large amount of power while it is turned on. This results in high energy consumption if the signal acquisition and synchronization take a long time. Most prior-art GPS receivers do not have signal storage (memory) and must process the received signals in real time. Furthermore, they use either a sequential search or search a small number of satellite/code-offset/Doppler (SCD) bins simultaneously to achieve signal acquisition. Such receivers must continually receive and process each satellite signal until its SCD bin is identified and the necessary NAV data is decoded. With a sequential search the energy consumption is high because substantial time is elapsed before the SCD bin associated with each GPS signal is identified. Alternatively, multiple SCD bins can be searched in parallel to reduce the elapsed time, but the energy consumption is still high because the existing processing methods are not very low power methods. Furthermore, the degree of parallelism is very limited with existing processing methods due to the large amount of circuitry involved.

In one system of the invention, a central facility or station must track multiple assets (e.g., railcars). Each tracked object carries a GPS receiver that processes data from several of the visible GPS satellites; however, an accurate position determination is not made at the receiver. Instead, only partial processing is done at the receiver and intermediate results are transmitted from the asset to the central station. These intermediate results do not require decoding of navigational or other data from the GPS signals. This system thus allows the GPS receiver and signal processor to be powered only long enough to acquire the satellite signals (determine the SCD bins). With this system, the dominant energy consumer is the acquisition process, and the GPS receiver energy used at each tracked asset will be dramatically reduced if the signal acquisition time and energy are dramatically reduced.

U.S. Pat. No. 5,420,593 to Niles uses a memory to store an interval of the received signal containing multiple GPS satellite signals. The received signal is sampled and written into the memory at one rate and then read from the memory at another, faster rate. Upon reading, the signal is digitally processed to acquire and synchronize with the received GPS satellite signals. This allows a shorter elapsed time for the acquisition of the GPS signals. However, the receiver is not turned off immediately after signal storage, and low-power signal acquisition is not used. Furthermore, substantially reduced energy consumption is not achieved.

U.S. Pat. No. 5,225,842 to Brown describes a GPS based centralized asset tracking system that reduces the cost of the GPS receivers on each tracked asset by avoiding calculation of the navigation solution at the asset. Each asset carries a GPS receiver that processes the signal from several of the visible GPS satellites and relays the processed result to the central station where accurate asset navigation solutions are calculated. This system does not substantially reduce the energy consumed by the GPS receiver at the asset and does not substantially extend asset battery life or reduce time between service to replace batteries. Furthermore, low-power parallel correlation is not used.

SUMMARY OF THE INVENTION

One object of the present invention is to provide a direct sequence spread spectrum (DSSS) signal processing architecture which permits the receiver to be turned off during most of the acquisition phase of reception, thereby permitting the on time of the associated receiver front end to be significantly reduced.

Another object of the invention is to provide a signal processing architecture which permits low power consumption during the acquisition phase of DSSS signal reception.

A further object of the invention is to provide a low-power parallel correlation method that is readily manufactured with available integrated circuit processes and utilizes low energy to acquire DSSS signals.

Another object of the invention is to provide a GPS signal processing architecture which permits P/N code and Doppler searches (associated with the acquisition process) to be performed with a standard sequential processor (i.e., relatively slowly and with a small processing resource) without requiring the receiver front end to be turned on during the search process.

Yet another object of the invention is to provide a GPS signal processing architecture that requires little energy to track an asset using the GPS.

Still another object of the invention is to provide a signal processing architecture that can dynamically exchange coherent and non-coherent integration times as is needed for a particular received signal-to-noise ratio (SNR).

A still further object of the invention is to employ a low receiver output sampling rate in obtaining accurate sub-chip DSSS signal acquisition timing.

Yet another objective of the invention is to provide a GPS signal processing architecture exhibiting rapid acquisition of GPS satellite signals.

Still another objective of the invention is to provide a GPS signal acquisition method that allows rapid and low-energy signal acquisition even when the GPS receiver uses an inexpensive local oscillator that may be inaccurate.

According to one aspect of the invention, a low-power high-speed parallel correlator is used during DSSS signal-acquisition to reduce the acquisition energy consumption. Receiver energy consumption is further reduced because the time that the receiver must be in the on condition is reduced due to the speed of the parallel correlator.

According to another aspect of the invention, a time interval of receiver output data is sampled and stored in a memory and then the receiver is turned off. The time interval is long enough to allow acquisition of any of the received CDMA DSSS signals contained in the stored receiver output data. The stored receiver output data is re-played from memory as many times as may be required to acquire each desired CDMA signal. To keep processing energy consumption low, a low-power parallel (partial analog) correlator may be used in the acquisition process. This approach uses much less energy than existing digital cross-correlators.

The centralized GPS tracking system according to the invention allows the tracked assets to consume very low power and use a receiver with an inexpensive local oscillator. The use of a parallel correlator allows the local oscillator to be inaccurate because many frequencies are readily searched during the acquisition process using low power. Furthermore, use of the parallel correlator allows reception and demodulation of the GPS NAV data to be avoided, further reducing the average on time of the receiver. The almanac is no longer needed to support a reduced satellite search time because the parallel correlator can quickly search over all satellite codes. Since the navigation solution is not needed at the tracking units, only limited processing consuming very low power is needed, the navigation solution being generated at a central station.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF PREFERRED EMBODIMENTS OF THE INVENTION

Figure 1:
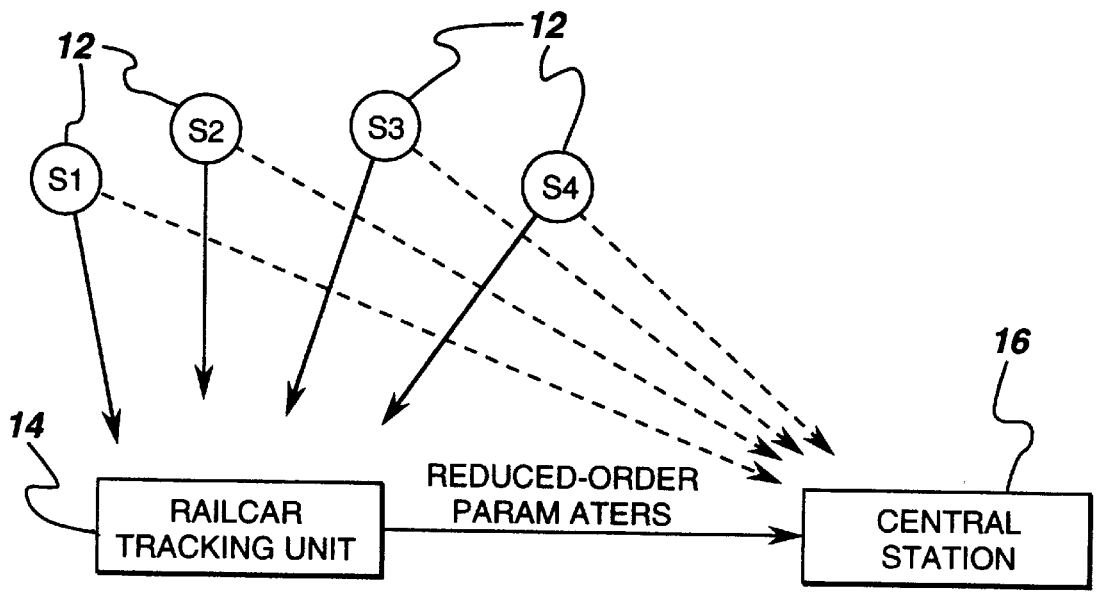
FIG. 1 is a block diagram of a remote tracking system in accordance with the present invention.

FIG. 1 illustrates a plurality of GPS satellites 12, an object (asset) being tracked, such as a rail car carrying a tracking unit 14, and a central station 16. As described earlier, each satellite 12 transmits a signal that a GPS receiver in tracking unit 14 uses to measure the propagation delay (and delay rate, if asset velocity is desired) from that satellite to the receiver antenna. The satellite signals also include the periodically repeating NAV data that is needed to determine a navigation solution from the measured time delays. Because of the low rate (50 bits per second) of the NAV data in the GPS signal, a receiver must be active for a substantial period of time (from one to several minutes) if the NAV data is to be collected. Furthermore, a particular satellite's NAV data changes over time and the GPS MCS monitors these changes and provides nearly hourly updates to the NAV data. To insure accurate navigation solutions, any GPS based navigation system must use NAV data that is no more than about four hours old. If the asset positions are to be monitored more frequently than every four hours, then new NAV data will have to be collected at least every four hours. NAV data maintenance then requires an approximate average of fifteen seconds of receiver operation per hour, and this entails a significant energy requirement if done at each tracked asset.

According to one aspect of the present invention, the navigation solution is calculated at the central station instead of at the asset. None of the NAV data is needed at the tracked asset. Only data relating to the GPS signal propagation delay between each satellite and the asset need be measured at the asset, and this data is then sent to the central station. The NAV data can be determined at central station 16 by utilizing a standard GPS receiver there, or by communicating with an appropriately located standard GPS receiver. If desired, the NAV data, or the navigation solutions, can be communicated to the tracked assets via a higher rate communication link that requires less energy to receive at the asset. With no NAV data decoding needed at the asset, GPS signal acquisition becomes the main GPS processing task at the asset, and the feasibility of the centralized tracking system is greatly enhanced by the low-energy acquisition methods of the invention.

Figure 2:
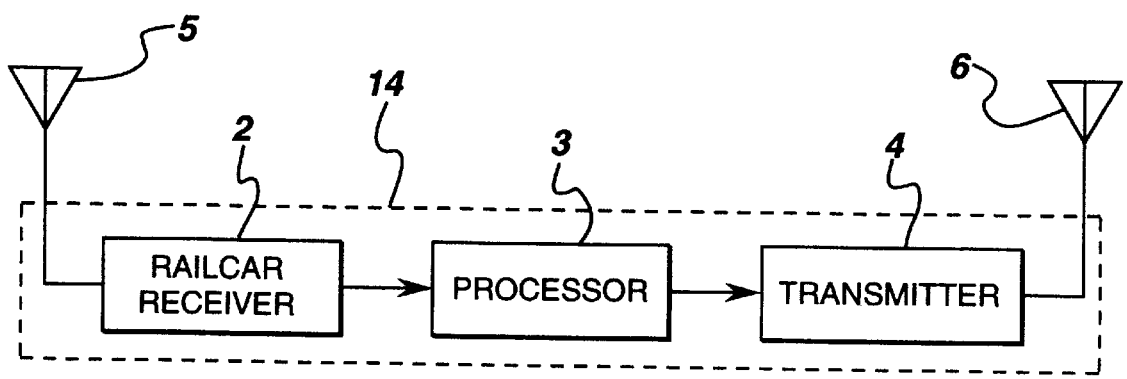
FIG. 2 is a block diagram of a tracking unit on an object to be tracked in accordance with the invention.

As shown in FIG. 2, a rail car tracking unit 14 is comprised of a receiver 2 responsive to the signals received at an antenna 5 from the GPS satellites, a processor 3, and a transmitter 4. The received signals are processed in processor 3 to ascertain and utilize propagation time differences among the signals received from the GPS satellites. By utilizing time differences, the need for knowledge of the GPS signal time-stamps at the asset is alleviated, and data stream decoding is therefore unnecessary at the asset. With no need for GPS data stream decoding, the receiver process reduces to acquisition of the GPS signals and calculating the relevant time differences (and Doppler frequency differences, if asset velocities are to be determined) from the acquisition results. The calculated time differences, and data identifying the satellites associated with the differences, are transmitted by transmitter 4 from an antenna 6 to the central station. A description of the centralized tracking system in which GPS signal acquisition is a major part of the assets' GPS energy budget is found in co-pending application Ser. No. 08/456,229 of Harrison, Pradeep, Brooksby and Hladik, referenced above.

Figure 3:
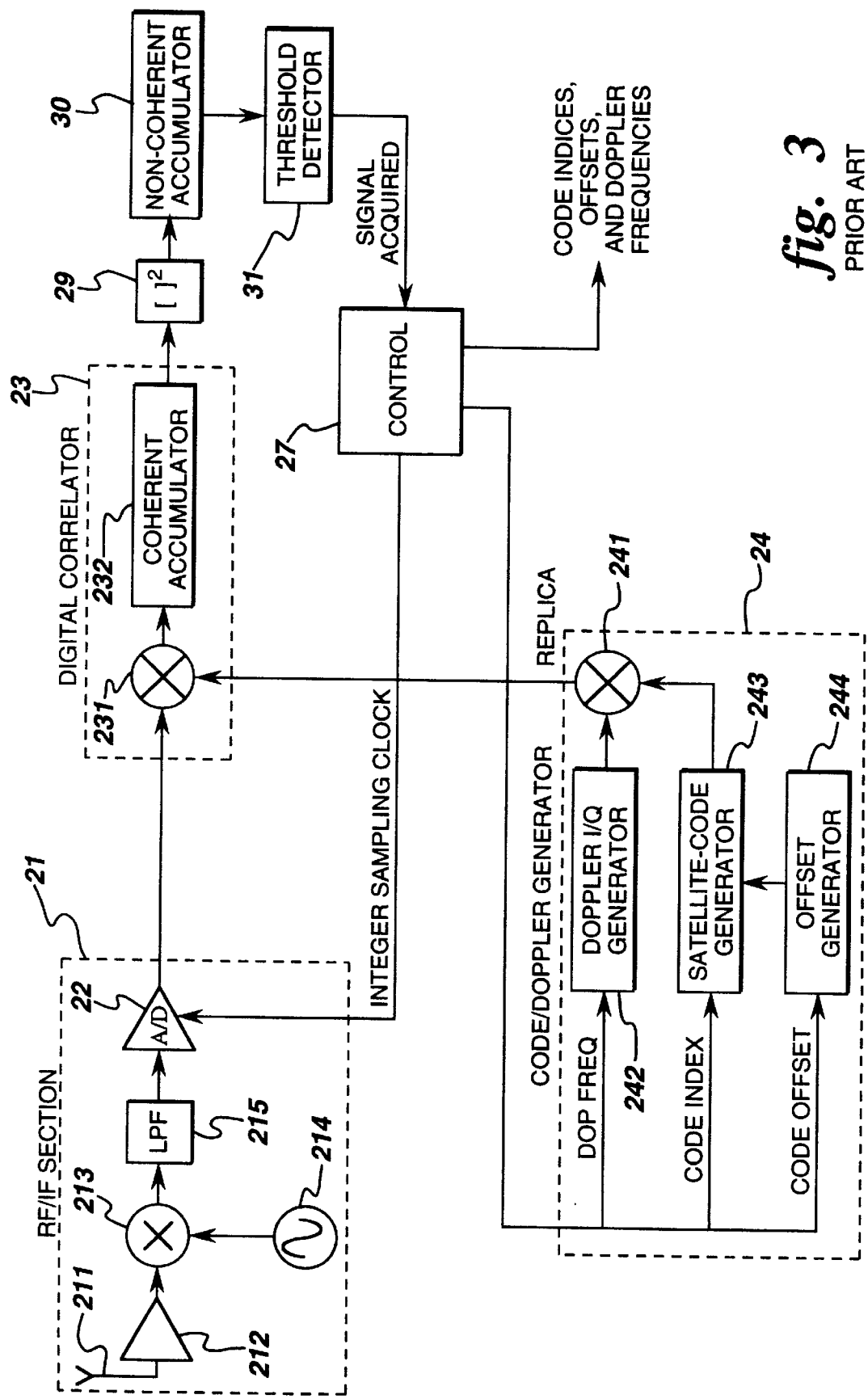
FIG. 3 is a block diagram of a conventional sequential acquisition architecture.

FIG. 3 shows a conventional serial acquisition architecture that uses a serial correlator. In a conventional GPS receiver, signal acquisition is followed by carrier and P/N code synchronization and NAV data demodulation, but modules for these processes are not shown in FIG. 3. The signal acquisition architecture comprises an RF/IF (radio frequency/intermediate frequency) tuner section 21 including an antenna 211, an RF amplifier 212, a mixer 213 and local oscillator 214, and a low pass filter 215 which supplies a received and down-converted signal to analog-to-digital (A/D) converter 22. A/D converter 22 typically samples and converts at an integer multiple of the replica C/A code chip rate and supplies a digital sequence to a serial digital correlator 23. Correlator 23 serially computes the inner product of a digitized receiver-output sub-sequence from A/D converter 22 and a C/A replica code sub-sequence originated from a code/Doppler (or replica) generator 24. The inner product is performed serially by first multiplying the first terms of the two sub-sequences in a multiplier 231 and storing the result in a coherent accumulator 232, then multiplying the second terms of the two sub-sequences and adding their product to coherent accumulator 232, etc. The inner product is performed in real time, as sub-sequence terms become available from A/D converter 22. As is conventional, the sub-sequences usually span a single period of the repeating C/A code. After an inner product has been computed, the coherent accumulator contains a sample of the cross correlation of the received sub-sequence with one C/A code cycle of the replica signal, for the particular C/A code, code-offset and Doppler frequency generated by the replica generator. The inner product operation is repeated with several following sub-sequences from A/D converter 22 while using the same replica C/A code sub-sequence. The subsequent inner product results are then squared by a squarer 29 and summed in a non-coherent accumulator 30, yielding a non-coherent integration of the coherent processing results. The output signal of non-coherent accumulator 30 is examined by a threshold detector 31 and a "signal acquired" command is generated if the signal level in non-coherent accumulator 30 is sufficiently high. When a signal is acquired, a control 27 monitors the associated C/A code index (satellite index), code offset, and Doppler frequency, and commands code/Doppler generator 24 to either change to a different C/A code (for a different GPS satellite) and begin another search, or to stop if sufficient satellite signals have been acquired. If a signal is not acquired after the several sub-sequences from AND converter 22 have been processed, then control 27 commands code/Doppler generator 24 to change to a different C/A code, code offset, or Doppler frequency. As each satellite signal is acquired, control 27 supplies the associated code index, code offset and Doppler frequency to GPS signal synchronization and NAV data processing units (not shown).

Provision for searching all feasible C/A codes, code offsets and Doppler frequencies must be provided. Control 27 selects the desired C/A code and code offset through commands to a satellite-code generator 243 and offset generator 244. Offset generator 244 provides for a time offset of the generated code replica from satellite-code generator 243, relative to the bit stream from A/D converter 22. A Doppler I/Q generator 242 generates a digital representation of the sinusoid representing the combination of Doppler shift and local-oscillator frequency error assumed by control 27. The replica signal is generated by a multiplier 241 as the product of this sinusoid and the C/A code replica. To insure detection of the GPS signal, the RF/IF section 21 must generate both an in-phase (I) and a quadrature (Q) output signal (not shown in FIG. 3), and the two signals must be processed for signal acquisition. Furthermore, each of the I and Q RF/IF output signals must be processed with both the I and Q Doppler sinusoidal components, as is known by those skilled in the GPS art.

Figure 4:
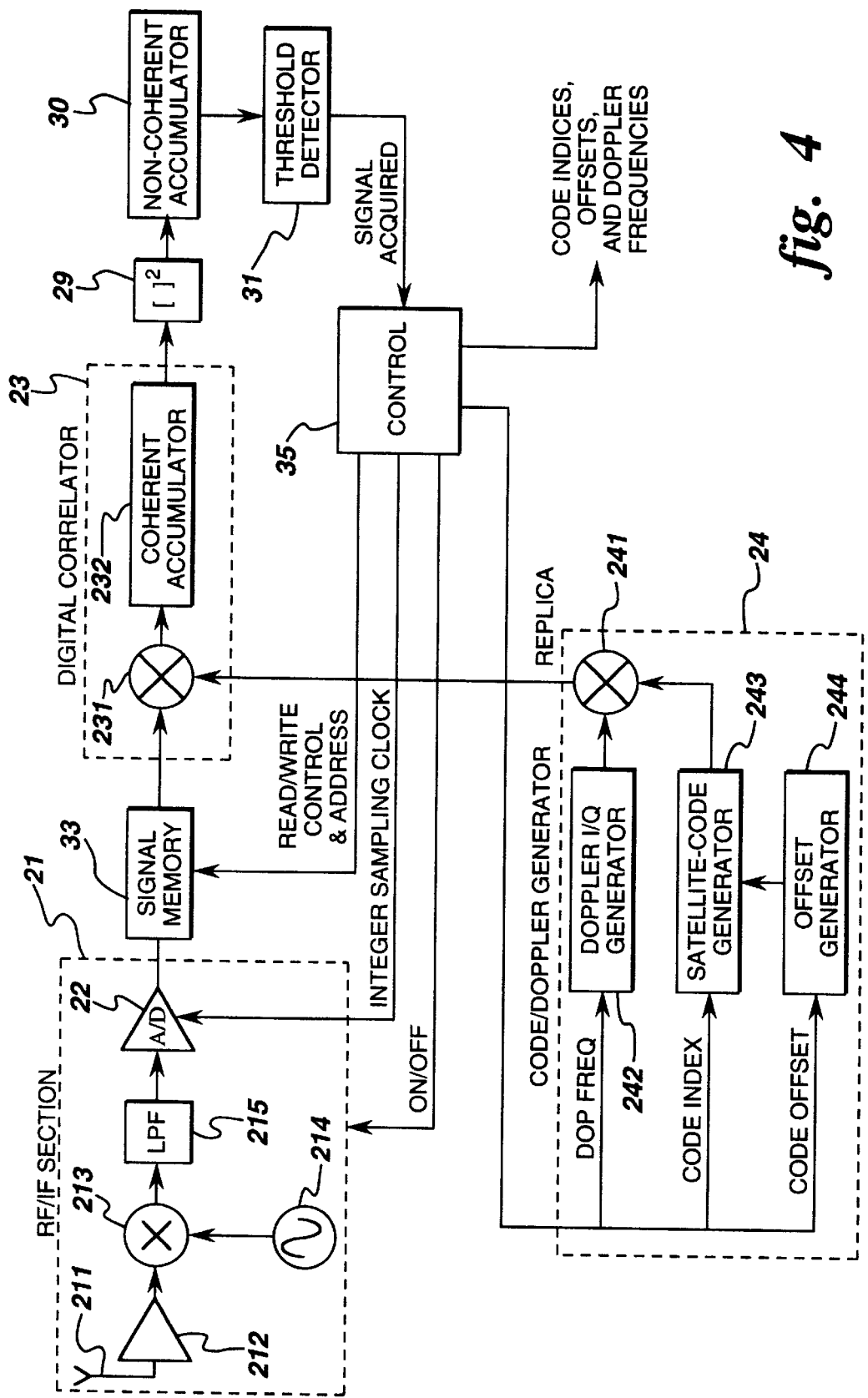
FIG. 4 is a block diagram of the sequential signal processing architecture according to one embodiment of the invention.

The conventional approach shown in FIG. 3 requires the receiver output data from RF/IF section 21 to be processed as soon as it is available, and processing is constrained by the code rate in the received signal. The architecture for an improved sequential signal acquisition processor according to one aspect of the invention is shown in FIG. 4. The architecture is similar to that of FIG. 3 except that a signal-storage memory 33 is added and power to RF/IF section 21 is now controlled by control 35. The GPS signal supplied by RF/IF section 21 is converted to digital format by A/D converter 22, but now the A/D sampling rate may be set at a low non-integer multiple of the C/A code rate. Memory 33 stores a length of input signal sufficient for signal acquisition and allows the RF/IF section to be turned off after storage. The acquisition process then proceeds by reading and possibly re-reading the data stored in memory. Energy consumption is thereby significantly reduced because the RF/IF section 21 consumes significant power. Furthermore, acquisition processing is no longer constrained by the code rate of the received signal, as noted in prior art. The non-integer input A/D sampling rate allows the acquisition processor to determine accurate GPS signal propagation time differences (needed for determining the location solution) while using a much lower sampling rate. Also, when the input SNR is not too low, or when accuracy requirements are not too high, the low non-integer sampling rate allows the time differences to be determined with sufficient accuracy that the conventional carrier and P/N code synchronization processes normally needed (e.g., the Costas phase-locked loop for carrier tracking, and the early-late delay-locked loop for code tracking) can be avoided.

An advantage of storing the received signal segment in memory and re-reading the memory as needed to process different SCD bins is that the correlation process can take place over a period of time without loss of signal-acquisition accuracy due to local oscillator instability or inaccuracy. Furthermore, if the stored signal is also used to derive the time delays needed for the navigation solution, there is no need to maintain accurate timing between the acquisition and tracking phases of GPS reception. For applications where the navigation solution is not needed immediately after measurement (e.g., asset tracking), a very low power GPS receiver can be constructed by using a very low-power integration process for the sequential correlator (and other circuits) in combination with a low-power data storage memory. Very low power large-scale integration processes are being developed in the industry (e.g., 1.5 v, 0.35 micron complementary metal-oxide-semiconductor or CMOS process).

With the GPS system, as in most DSSS systems, the SNR is very low before signal processing, and a substantial period of the received signal must be processed to yield the high SNR correlation peak needed for reliable signal detection by threshold detector 31. For normal civilian GPS applications, approximately 20 ms of signal from the RF/IF section 21 must be stored and processed. To keep the memory size small, the signal from RF/IF section 21 is sampled at a low rate and is quantized to only a few levels. For civilian applications, conventional GPS receivers typically achieve a GPS fix (location) accuracy of 30 meters. GPS fixes with this accuracy can be calculated from signal code offsets that are measured with an error of less than one tenth of a C/A code chip. The signal code offset is measured by noting the replica-signal code offset associated with the cross-correlation peak. In one embodiment of the invention, a sequence of results from non-coherent accumulator 30 are generated in order of increasing replica code-offset while holding the code index and Doppler frequency constant. If a large correlation result is observed, an interpolation algorithm is applied to the sequence of results and the code-offset associated with the correlation peak is estimated. A code-offset accuracy of one-tenth of a code chip is achieved while sampling the signal at approximately twice the C/A-code chip rate. Some conventional GPS receivers don't achieve the desired one-tenth chip accuracy during signal acquisition; instead, some do so during code synchronization by sampling the signal at twice the C/A-code chip rate and tuning the sampling phase as part of the early-late delay-locked loop. Alternatively, other conventional GPS receivers achieve one-tenth chip timing accuracy by sampling the signal at ten times the C/A-code chip rate and noting the code offset, in one-tenth chip increments, that yields the largest correlation peak. A reduced sampling rate requires less memory and lower processing rates.

The SNR at the input to A/D converter 22 is well below zero, so little signal degradation is suffered when the A/D converter uses just three appropriately chosen representation levels. Each sample can be conveniently encoded in sign-magnitude format using only two data bits. To insure signal detection, both I and Q RF/IF output signals must be generated, stored, and processed (only one RF/IF channel is shown in FIGS. 3 and 4). The use of three or more representation levels can provide substantial resistance to interference by non-GPS signals, as is known by those skilled in the GPS art. However, a smaller data memory is required if only two representation levels (one bit) are used for the I and the Q signals, and this has a cost advantage in some applications. In one embodiment of the invention, the I and Q RF/IF output signals are digitized and stored simultaneously, and the data memory length is sufficient to hold the entire data sequence needed to achieve acquisition (e.g., 20 ms). With 1023 C/A code chips per millisecond and both I and Q RF/IF signals being sampled at approximately two samples per code chip with two bits per sample, approximately 170,000 bits of storage are required for the 20 ms signal segment. For convenience, the I and Q data can be considered as stored in separate I and Q memories. When the required data has been sampled, converted, and stored, the receiver can be turned off and the recorded data can be processed.

In the sequential method of this invention, the stored data is replayed (read) once during the correlation process for each combination of code, code offset, and Doppler shift. In the system of FIG. 4, the sequence of stored digital data samples are read from memory 33, one at a time. Each sample of the sequence from memory 33 is multiplied by the corresponding sample of the sequence from the code/Doppler generator 24 in multiplier 231, and the result is accumulated in coherent accumulator 232. The sequence or data segment from the code/Doppler or replica generator is crafted for a particular code, code offset, and Doppler frequency under test. The length of the memory sequence so processed is the coherent integration length, and is typically chosen as one full cycle of the C/A code, which is 1.0 milliseconds (ms). Several (e.g., twenty) adjacent 1.0 ms memory data segments are processed in this manner without changing the replica sequence. After each 1.0 ms segment is processed, the value stored in coherent accumulator 232 represents the cross correlation between the 1.0 ms replica and data segments (sequences). This value is squared by squarer 29 and added to non-coherent accumulator 30. Before the first 1.0 ms segment is processed for a given replica signal, non-coherent accumulator 30 is reset to zero so that the final accumulated result represents the total correlation score for the particular code, code offset, and Doppler frequency specified by the replica signal. Similarly, the coherent accumulator is reset before each 1.0 ms segment is processed. Threshold detector 31 monitors the correlation score and produces a "signal acquired" signal if the score is larger than a specified threshold. Upon receipt of a "signal acquired" signal, control 35 performs a simple peak-search and interpolation algorithm (described subsequently) to find the best estimate of the code offset associated with the given code index and Doppler frequency under examination. Control 35 then selects another code, code-offset, and Doppler frequency combination and commands replica generator to alter the replica signal to reflect this change. The signal acquisition process is repeated for multiple replica signals corresponding to the codes, code offsets, and Doppler frequencies to be searched, and is stopped when the desired number of GPS signals (different C/A codes) have been acquired. Control 35 then produces as an output signal the code indices, estimated offsets, and Doppler frequencies associated with the acquired signals.

The I and Q memory data can be processed sequentially, (e.g., process all I data, then process all Q data) using one digital correlator 23 as shown in FIG. 4. Alternatively, the I and Q memory data can be processed simultaneously using separate digital correlators. In any event, to insure signal acquisition, I and Q Doppler processing must be performed on both the I memory data, and the Q memory data. Thus there are four I-Q combinations and they can be processed sequentially with a single digital correlator, or simultaneously with multiple correlators. In one sequential method, the correlation result for the full memory data sequence with a given replica code index, code offset, and Doppler frequency is calculated as follows: First, the coherent and non-coherent accumulators are reset to zero. Then the I memory data is processed with the I Doppler replica and the correlation result is accumulated in the coherent accumulator. The Q memory data then is processed with the Q Doppler replica and the correlation result is further accumulated in the coherent accumulator. The total coherent-accumulation result is then squared by squarer 29 and added to non-coherent accumulator 30. The coherent accumulator is then reset. Next the Q memory data is processed with the I Doppler replica and the correlation result accumulated in the coherent accumulator, then the I memory data is processed with the Q Doppler replica and the correlation result is inverted (multiplied by −1) and further accumulated in the coherent accumulator. The total coherent-accumulation result is then squared by squarer 29 and added to non-coherent accumulator 30. This process is repeated for each 1.0 ms memory data segment, without resetting the non-coherent accumulator between segments, and requires two full read cycles of both the I and Q memory data. Acquisition time and energy can be reduced by using separate I and Q Doppler generators 242, multipliers 241, and digital correlators 23 to process all four I-Q combinations simultaneously.

In one convenient rendition, code/Doppler generator 24 is comprised of Doppler I/Q generator 242, satellite code generator 243, offset generator 244, and multiplier 241, as shown in FIG. 4. Doppler I/Q generator 242 generates a digital sequence representation of a sine or cosine wave at the desired frequency relative to the sample rate, and can, for example, be implemented with a Read Only Memory (ROM) driven by an address counter. The frequency and phase (I or Q) of the sinusoid can be selected by control of the order in which the stored sinusoidal samples are read (e.g., by address decimation and by selection of the starting address, respectively). Other digital sinusoid generators are also known to those skilled in the art. For the GPS C/A codes, a well known state machine can be used to generate the C/A code bits in the proper order. The Doppler sinusoid and C/A code values are multiplied by multiplier 241 to yield the replica signal. Provision for searching all feasible code offsets is provided by a time offset of the stored code replica from satellite code generator 243 using offset generator 244. With the state-machine implementation of satellite-code generator 243, a particular code offset is effected by presetting the state machine to the associated state before starting the correlation process. The initial states, corresponding to different code offsets, can be stored in a ROM and indexed by a simple binary address counter.

In practice, the acquisition search is conveniently performed by first selecting a code and a Doppler frequency, and then indexing through different code offsets. Then the Doppler frequency is changed and the different code offsets are re-examined. Non-coherent accumulator 30 can be implemented as an array of accumulators, one for each candidate code offset in a sequence of adjacent offsets. This accumulator organization allows the scores for adjacent offsets to be simultaneously examined so that an interpolation algorithm can be applied to find the sub-chip offset value associated with the actual score peak. If a sequential interpolation algorithm is used, the peak offset value can be interpolated while using only a single accumulator element.

The total acquisition time can be reduced by processing multiple code offsets simultaneously. For example, multiple digital correlators 23 can be used, each driven with a differently delayed version of the replica signal. The different delays can be implemented with a tapped delay line coupled to the output of code/Doppler generator 24. The different taps can then each drive a separate serial digital correlator 23, and the results from each correlator can be separately squared and accumulated in associated elements of a non-coherent accumulator array.

Figure 5:
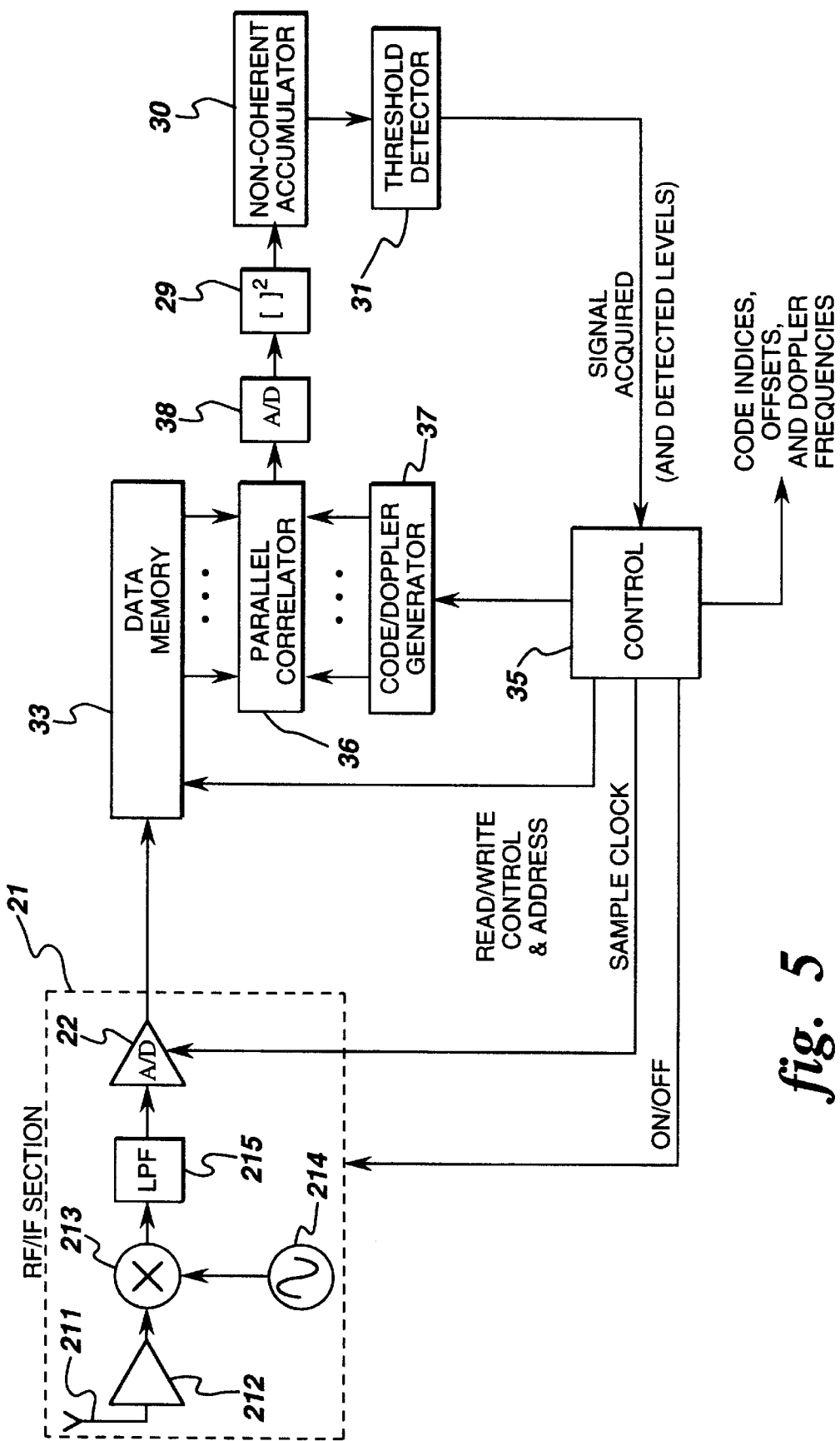
FIG. 5 is a block diagram of the parallel signal processing architecture according to another embodiment of the invention.

An alternative GPS receiver architecture that provides for both low-power and fast signal acquisition, according to another aspect of the invention, is shown in FIG. 5. The acquisition architecture is similar to that of FIG. 4, except that the serial digital correlator, serial Doppler and P/N code generators, and serially read memory are now replaced with a parallel correlator 36, parallel Doppler and P/N code generators 37, and a parallel read memory 33, respectively. One aspect of the invention is a method for massively parallel analog summation in the parallel correlator. The analog summation, in combination with the massively parallel organization of the memory, replica-generator, and correlator elements, provides for the dramatic time and energy reductions in the correlation process. The analog summation result is converted to digital form by A/D converter 38 which may be combined with squarer 29, as described subsequently. The parallel architecture also takes advantage of conventional low-power complementary metal oxide semiconductor (CMOS) integrated circuit technology to achieve low-energy use. Energy use in CMOS circuits is dominated by the charging and discharging of circuit node capacitances; little energy is used at nodes whose voltages are static (unchanging) or whose capacitance is small. With this invention the Doppler and P/N code replica generators and registers, data memory, and parallel correlator are organized to minimize the number of CMOS nodes being charged and discharged during the correlation process.

Figure 6:
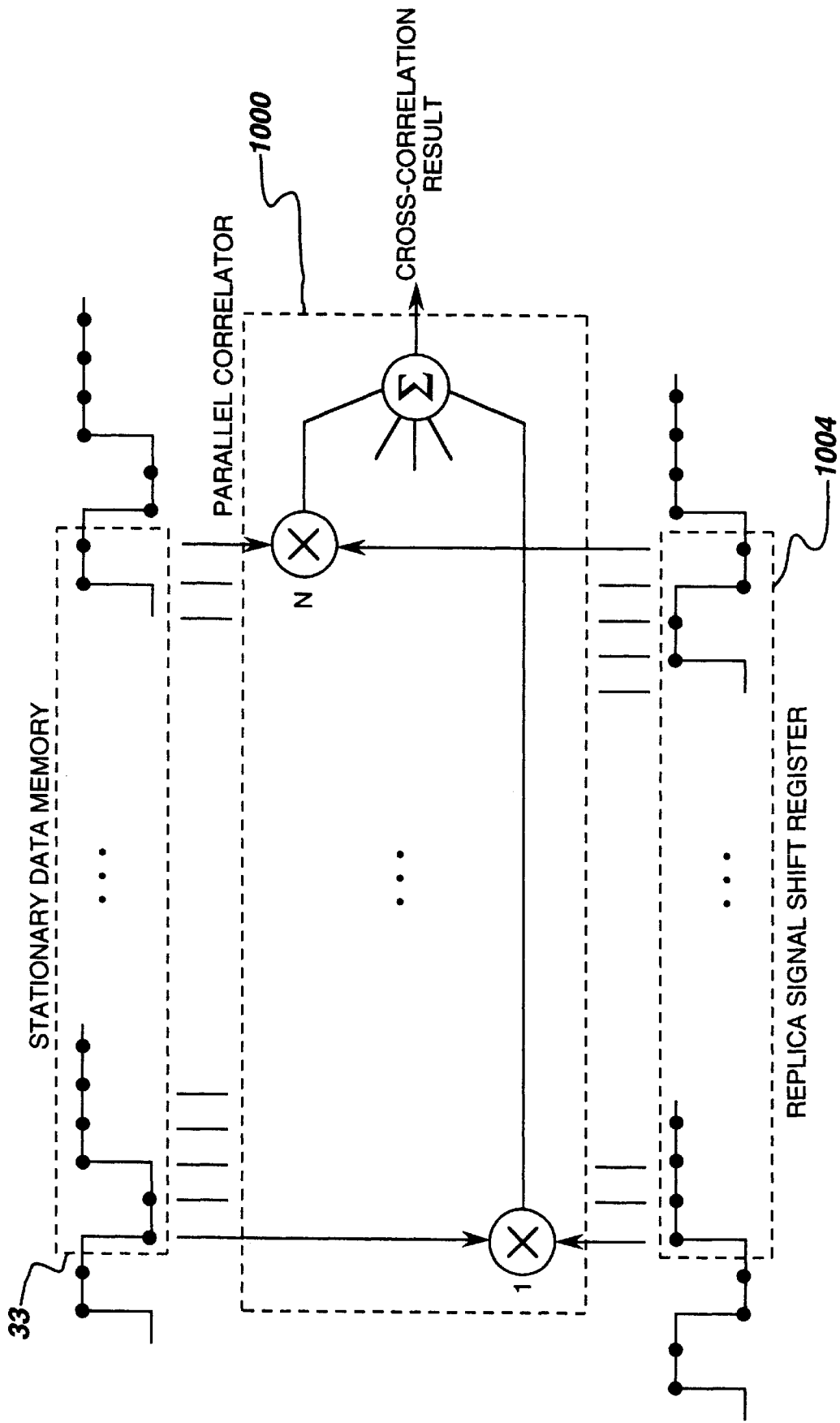
FIG. 6 is an illustration of the parallel correlation process between the stored-data and sliding replica waveforms.

FIG. 6 illustrates the parallel correlation concept and shows waveforms for the case where the received and replica signals have no Doppler shift. Digitized signal data is written sequentially into the data memory as it becomes available from the RF/IF section 21 and A/D converter 22. Data memory 33 is organized for a massively parallel output so that a long sequence of data is available at the output simultaneously. Also, a shift register 1004 is loaded with the chosen replica signal and is organized for a massively parallel output with the same length as that from the data memory. A sample of the cross-correlation (i.e., the inner product) between the parallel data sequence and parallel replica sequence for a given Doppler frequency, code index and code offset is generated all at once by parallel correlator 1000. In parallel correlator 1000, each element of the memory data sequence is multiplied by the corresponding element of the replica sequence using a corresponding multiplier in an array of multipliers. The multiplier output signals are simultaneously summed to form the coherent processing result at the correlator output. The coherent processing result for an adjacent code offset is generated by shifting the replica register one step while holding the memory data stationary. Alternatively, the replica signal can be held stationary while the memory data is shifted.

In one attractive embodiment of the invention, the parallel-output data and replica sequences are 1.0 ms long and span a single cycle of the C/A code. The data sequence is generated from the RF/IF output signal by sampling at the rate of approximately two samples per C/A code chip and digitizing to three levels with an A/D converter using a two-bit sign-magnitude format. This sampling rate and number of levels avoids aliasing, avoids substantial SNR degradation if the A/D threshold levels are properly chosen, and yields sequence lengths on the order of 2100 samples. The sign-magnitude format allows a simple multiplier to be used in the multiplier array described above. Other attractive data representations, sampling rates, and parallel-output sequence lengths are possible, as will become apparent to those skilled in the art.

Figure 7:
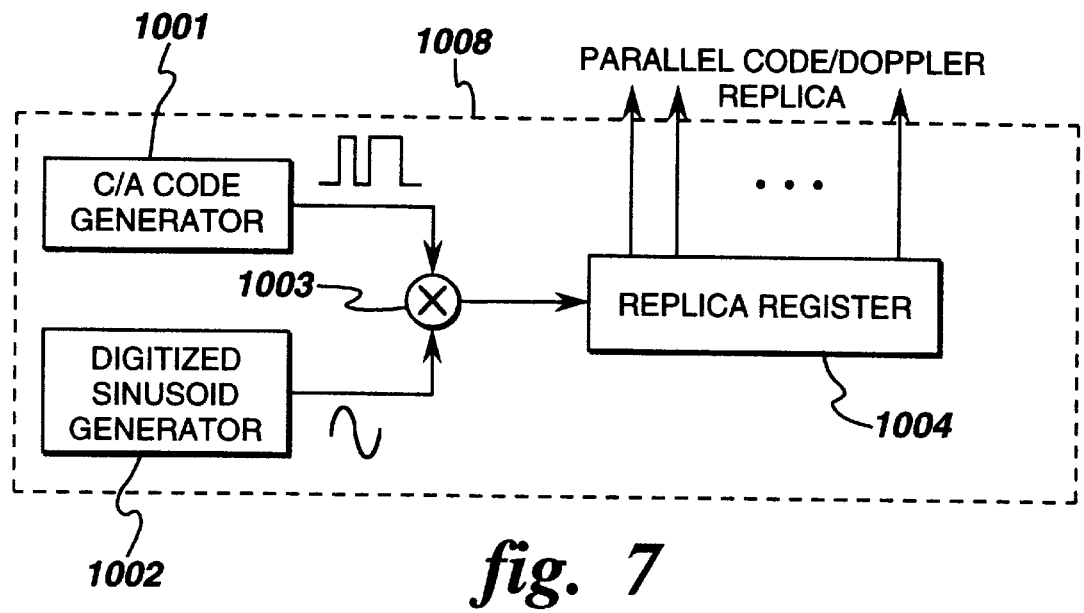
FIG. 7 is a block diagram showing a structure for generating the replica sequence.

FIG. 7 shows one method for generating the parallel-output replica sequence. In a code/Doppler generator 1008, a C/A code generator 1001 generates the desired C/A code sequence and a digitized sinusoid generator 1002 generates the digitized sinusoid sequence with the desired phase and Doppler frequency. A multiplier 1003 sequentially multiplies the code and sinusoid sequences provided by code/Doppler generator 1008 to generate the replica sequence, and this sequence is shifted into a parallel-output code/Doppler (replica) register 1004.

The replica sequence is preferably represented in three level (two-bit) sign-magnitude format, or a two-level (one-bit) sign format, as these formats reduce the complexity and power consumption of the parallel correlator with respect to a format that uses more bits. With only three or fewer levels, the Doppler component in the replica sequence will have high harmonic content and these harmonics can falsely correlate with an input signal. This problem can be avoided by choosing the RF/IF local oscillator frequency so that the RF/IF output signal is substantially offset from zero frequency. By choosing the offset large enough, the harmonics of all resulting necessary Doppler-replica frequencies will be well above the highest Doppler replica frequency. The harmonic problem is known by those skilled in the design of superheterodyne receivers. If desired, the Doppler-replica harmonic levels can be reduced by using more bits in the Doppler and replica sequence representation and more bits per sample in the replica register. However, this will increase the power consumption and complexity (size) of the signal-acquisition implementation.

Figure 8:
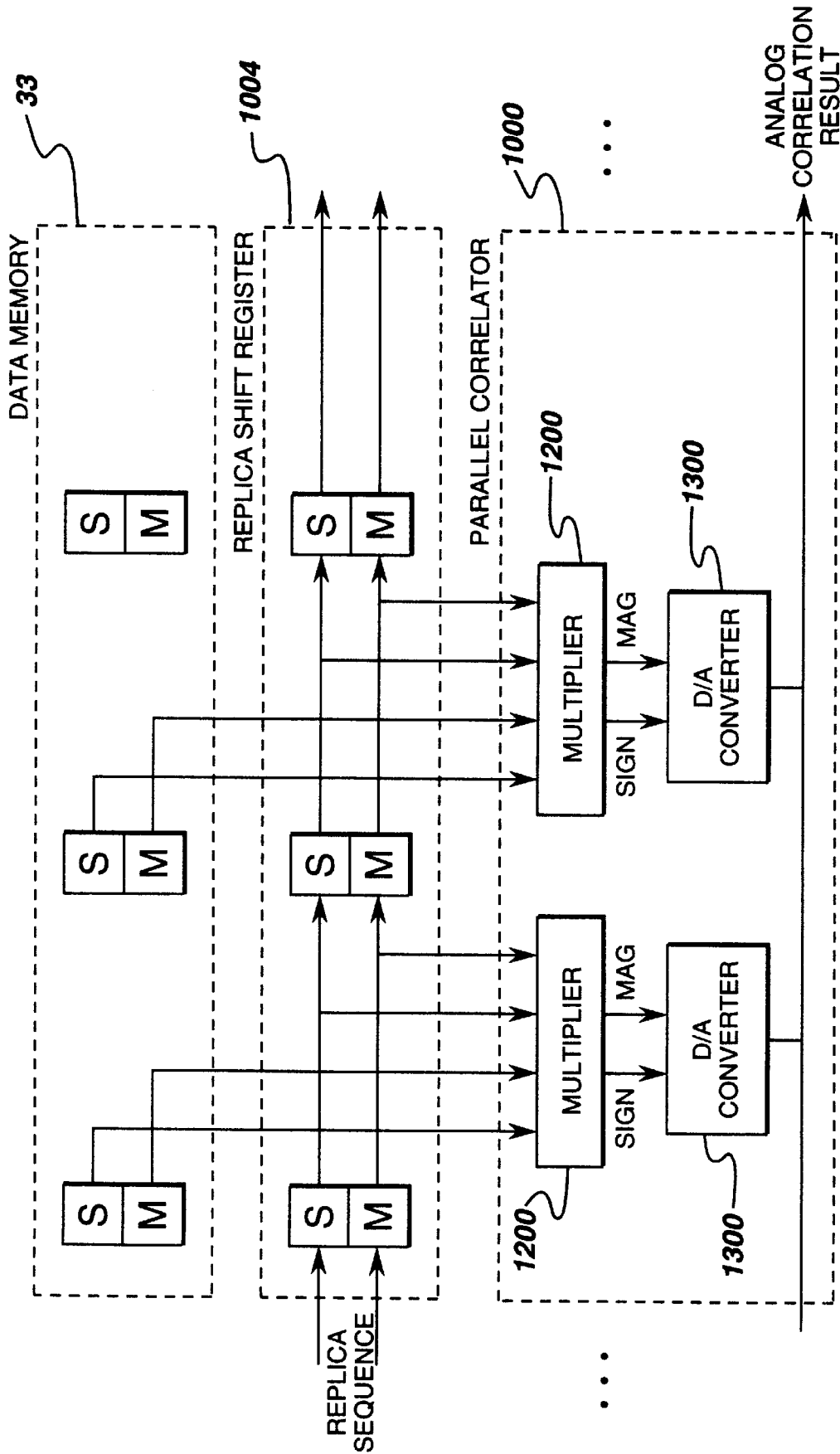
FIG. 8 is a block diagram showing a short segment of an embodiment of the data memory, replica register, and parallel correlator that uses the replica generation method of FIG. 7.

FIG. 8 shows a short segment of an embodiment of the data memory 33, replica shift register 1004, and parallel correlator 1000 that uses the replica generation method of FIG. 7. Both the data and replica sequences use a two-bit sign-magnitude representation, and since the rows of elements in each of memory 33, shift register 1004, and correlator 1000 are aligned with each other in columnar fashion the sign (S) and magnitude (M) bits of corresponding samples from the two sequences can be conveniently fed, in each column, to a corresponding multiplier 1200. With sign-magnitude input values of, for example, either –1, 0, or 1 from the two input sequences, each multiplier 1200 generates either –1, 0, or 1 as an output signal. A separate digital-to-analog converter 1300 converts each digital multiplier output signal to analog form. All D/A converter output signals are summed by being furnished to a common output that represents the analog correlation result. The analog summation is conveniently implemented using charge summation, but alternative analog summation forms are also possible. This summation method is spatially efficient, requires very low power, does not require any analog memory, and is very fast. Another advantage of this parallel correlator architecture is that the code and Doppler sequences are programmable, allowing a single correlator to rapidly search over multiple code indices, offsets, and Doppler frequencies in the acquisition process.

Figure 9:
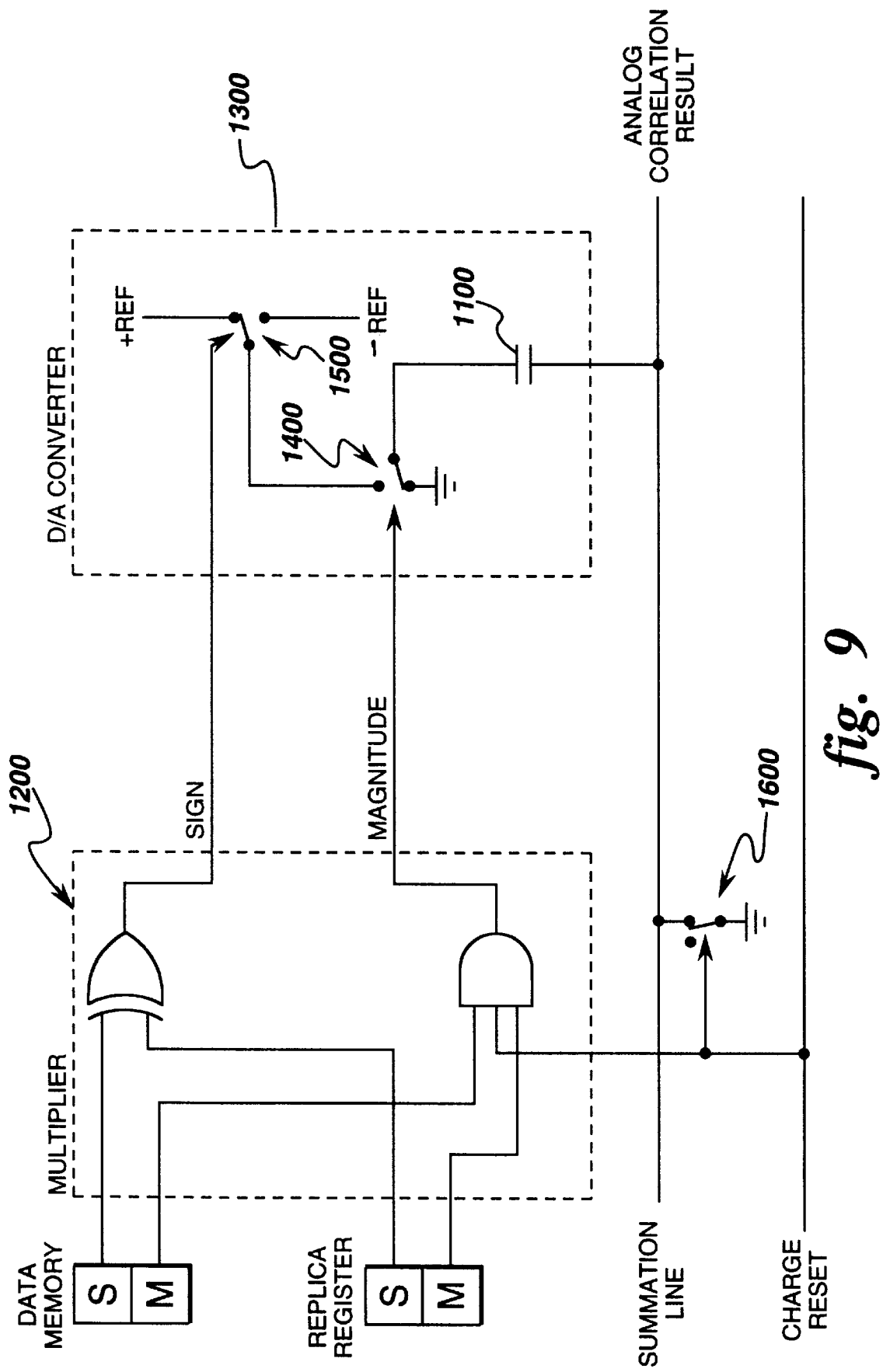
FIG. 9 is a block diagram showing one embodiment of one stage of the two-sequence parallel correlator of FIG. 8.

FIG. 9 shows one embodiment of one stage of the two-sequence parallel correlator of FIG. 8. Multiplier 1200 generates sign and magnitude output bits that control switches 1400 and 1500 in a D/A converter 1300. The switches connect one end of a charge summation capacitor 1100 to either a positive reference voltage rail or a negative reference rail, or to an output reference voltage rail (e.g., ground). The sum is generated by a two step procedure. First the charge-reset line is set low, closing a charge reset switch 1600 and forcing switch 1400 in each parallel correlator stage to connect the associated capacitor to the output reference rail (ground in FIG. 9). This discharges all capacitors. Then the charge reset line is set high, opening charge reset switch 1600 and allowing the data and replica values in each parallel correlator stage to control the associated sign and magnitude switches, 1500 and 1400, respectively. This two-step process insures that excess charge does not accrue on the charge summation capacitors over time. It is advantageous that this parallel correlator can be implemented in low-cost digital processes by using, for example, metal-metal "cross-over" capacitors and binary electronic switches. Finally, it is advantageous that the charge summation can be extended across multiple integrated circuits by simply extending the summation lines.

Figure 10:
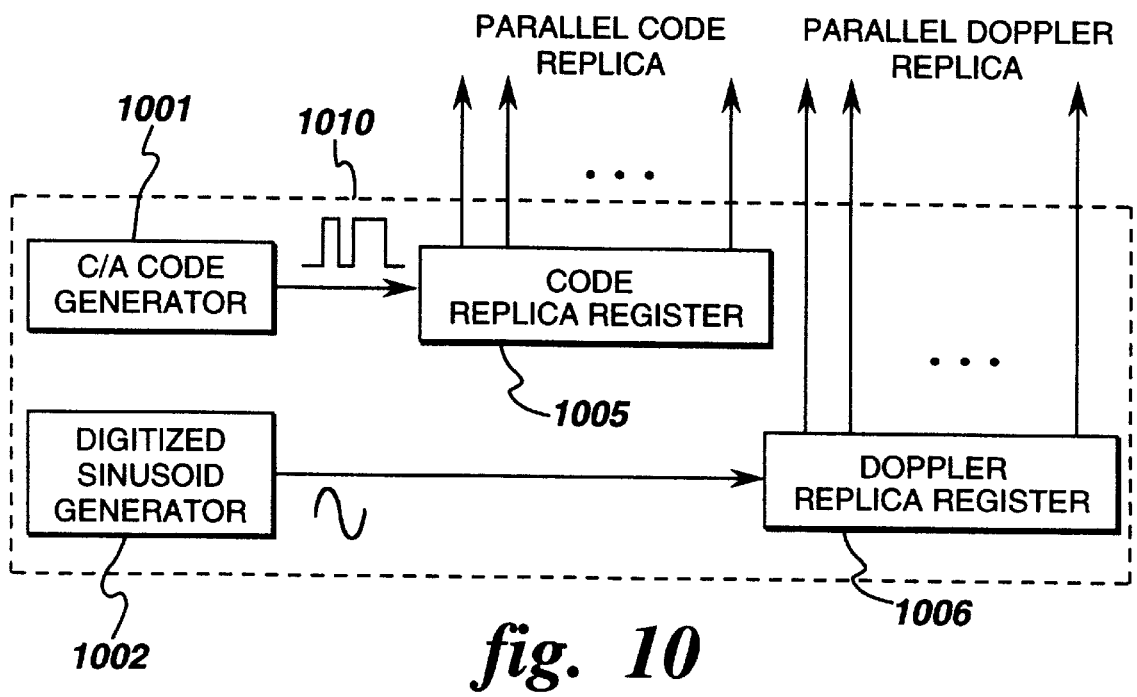
FIG. 10 is a block diagram showing a method for generating separate code and Doppler replica sequences.

FIG. 10 shows another method for generating the replica signal. With this method, the code and Doppler replica sequences are stored in separate parallel-output registers. C/A code generator 1001 of code/Doppler generator 1010 generates the desired C/A code sequence and this sequence is shifted into a code replica register 1005. Similarly, a digitized sinusoid generator 1002 of code/Doppler generator 1010 generates the digitized sinusoid sequence with the desired phase and Doppler frequency, and this sequence is shifted into the Doppler replica register 1006.

Figure 11:
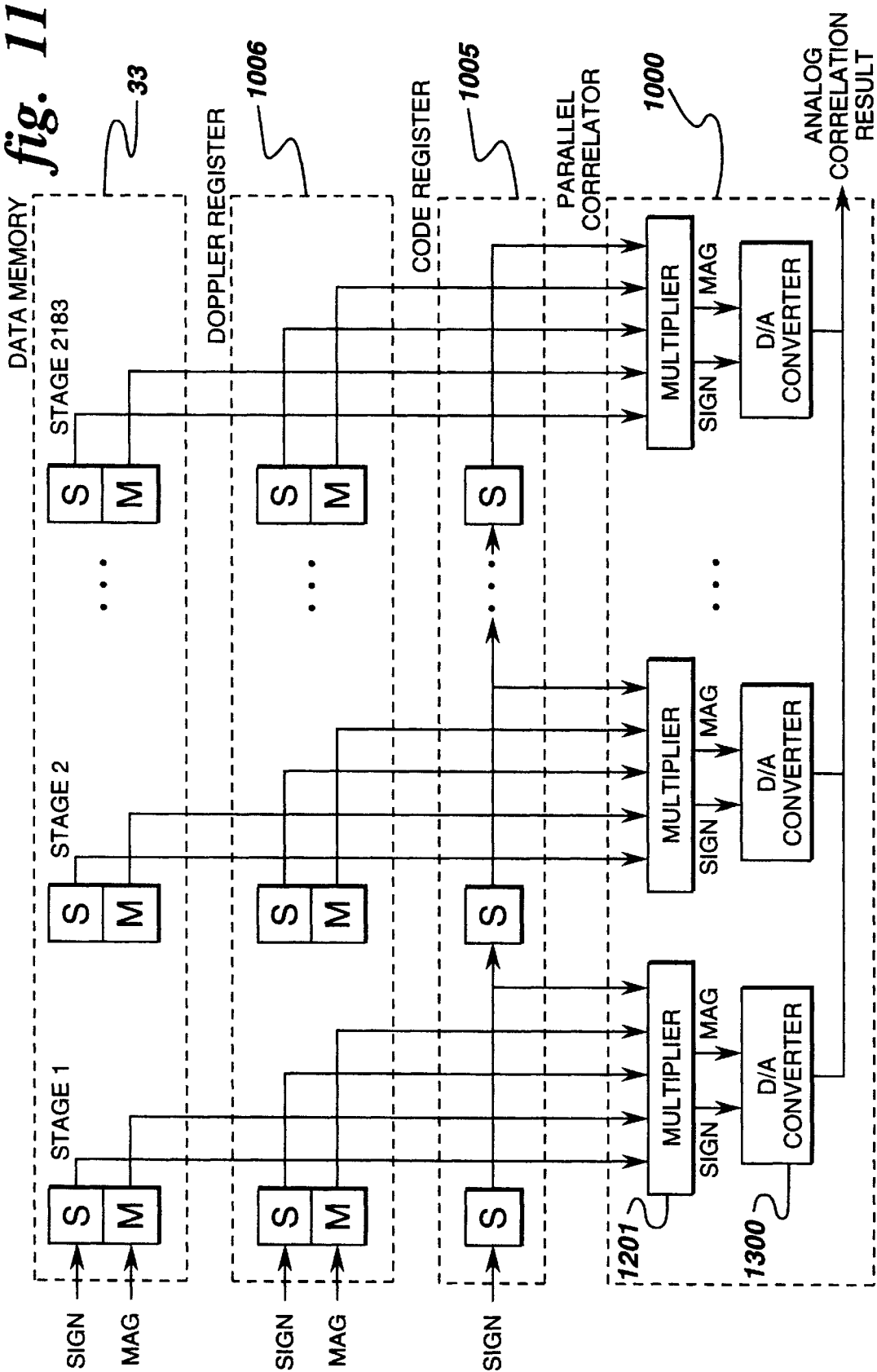
FIG. 11 is a block diagram showing an embodiment of the data memory, code-replica register, Doppler-replica register, and parallel correlator that uses the replica generation method of FIG. 10.

FIG. 11 shows an embodiment of the data memory 33, code-replica register 1005, Doppler-replica register 1006, and parallel correlator 1000 that uses the replica generation method of FIG. 10. A separate code register 1005 and Doppler register 1006 are used, yielding separate memory-data, code, and Doppler sequences. Sign (S) and magnitude (M) bits of corresponding samples from the three sequences are fed to corresponding multipliers 1201. With sign-magnitude input values of, for example, –1, 0, or 1 from the data and Doppler sequences, and –1 or 1 from the code sequence, each multiplier 1201 generates either a –1, 0, or 1 as an output signal. The different multiplier output signals are all simultaneously summed using analog summation as previously described for the two-sequence parallel correlator.

Figure 12:
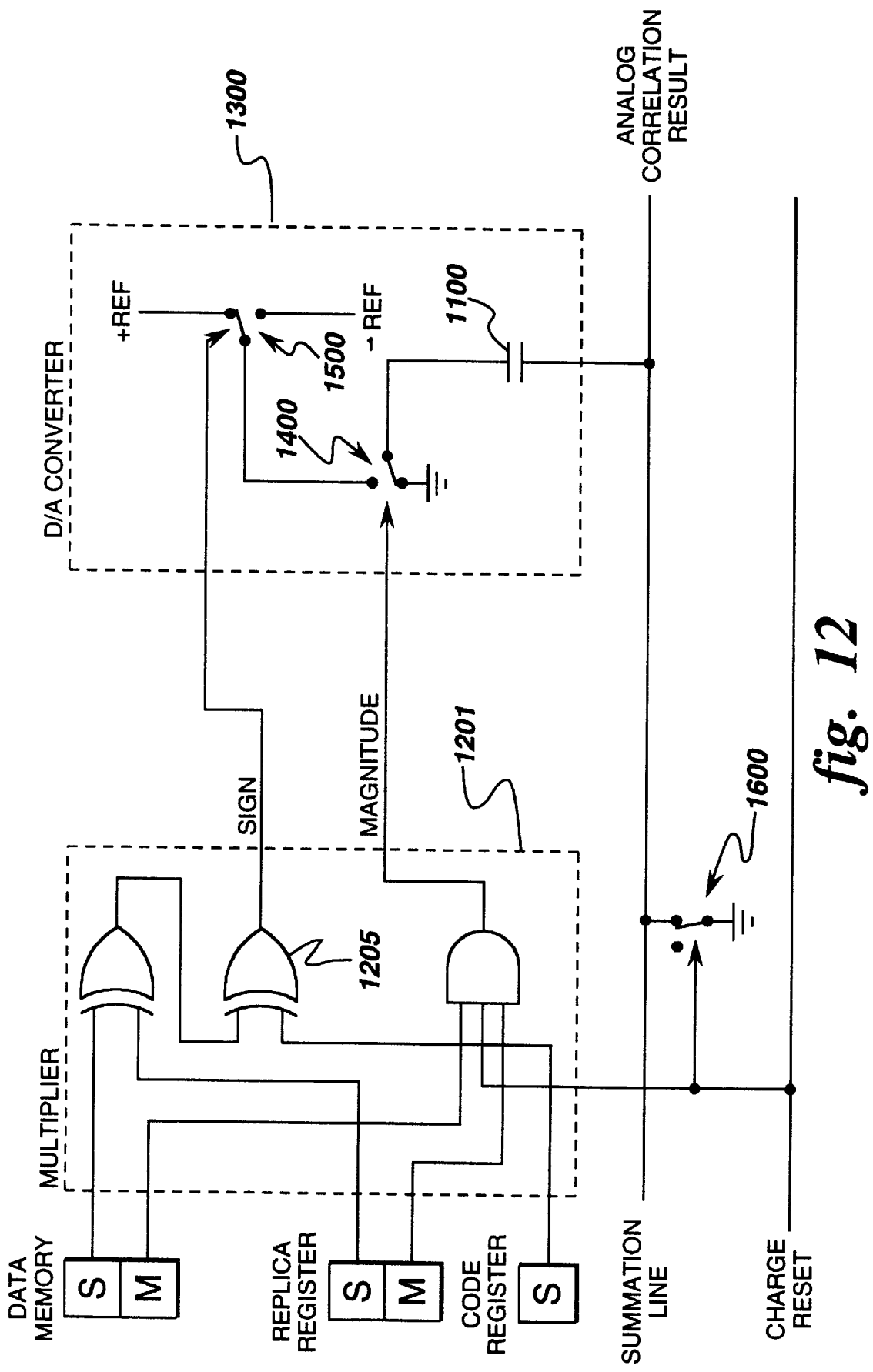
FIG. 12 is a block diagram showing one embodiment of one stage of the three-sequence parallel correlator of FIG. 11.

FIG. 12 shows one embodiment of one stage of the three-sequence parallel correlator of FIG. 11. The correlator stage shown is similar to that of the two-sequence parallel correlator of FIG. 9 except that the multiplier has an extra exclusive-or gate 1205 to allow the separate code register bit to impact the sign of the multiplication result.

The two and three sequence parallel correlators of FIGS. 8 and 11 can be generalized to plural sequence parallel correlators. With respect to the two sequence correlator, the three sequence correlator has had one of the cross-correlation sequences (the replica) decomposed into two separate sequences. This decomposition can be applied to both the data and replica sequences in general to provide a plural sequence parallel correlator or inner-product machine.

Figure 13:
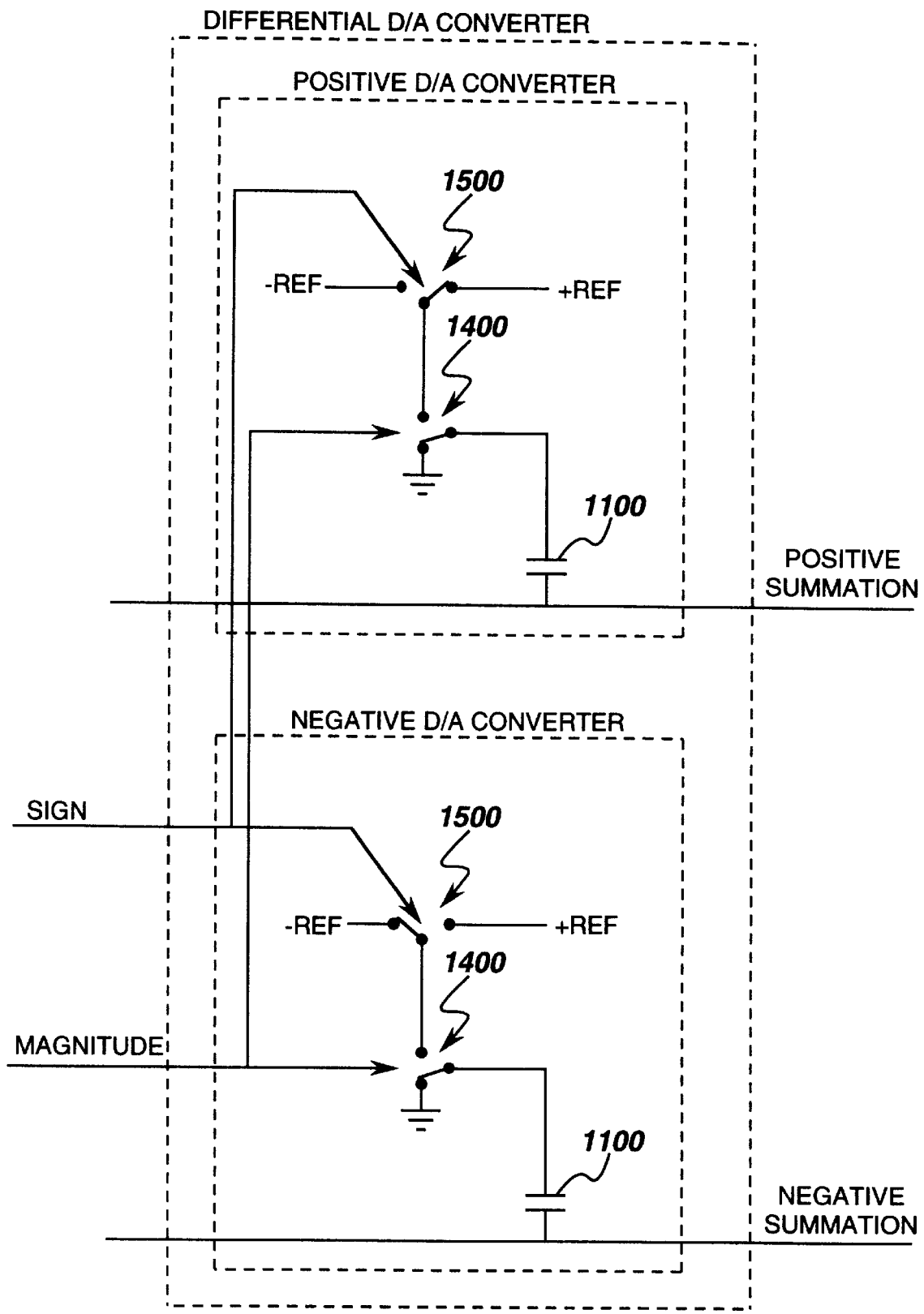
FIG. 13 is a schematic diagram illustrating the principles of the differential digital-to-analog converter and summation according to one aspect of the invention.

"Differential" analog summation in the parallel correlator may have lower noise susceptibility and other advantages. FIG. 13 shows one convenient differential summation configuration. In each stage of the parallel correlator, two D/A converters are driven in parallel by the same sign and magnitude output signals from the associated multiplier. One converter is labeled as positive and its capacitor connects to a positive summation line and the other converter is labeled as negative and its capacitor connects to the negative summation line. The switches shown in each converter are implemented as electronic switches, as is well-known in the art. The two converters operate identically except that the sign switch 1500 in the negative converter is connected in the reverse sense with respect to the sign switch of the positive converter. With the differential method, the difference between positive and negative summation results must be taken to determine the final coherent correlation result. This can be performed by, for example, using a high-speed linear or switched capacitor difference amplifier, as is known by those skilled in the art. Alternatively, the positive and negative summation results can be separately A/D converted and then their difference computed digitally prior to squaring and non-coherent accumulation.

The three-sequence parallel correlation method of FIG. 11 uses less power than the two-sequence method of FIG. 8 because only the 1-bit deep code register needs to be shifted when developing correlation results for subsequent code offsets; the sequence in the separate Doppler register can be held fixed. Shifting a register that is two bits deep consumes approximately twice the power as shifting a register that is one bit deep. Because register shifting is a dominant power consumer with the parallel correlation approach, the three-sequence method is advantageous. On the other hand, the two sequence method uses fewer shift register elements (bits) and fewer exclusive-or gates in the multipliers and therefore has a smaller implementation. The implementation size difference diminishes as the number of bits of Doppler replica representation is increased.

Figure 18:
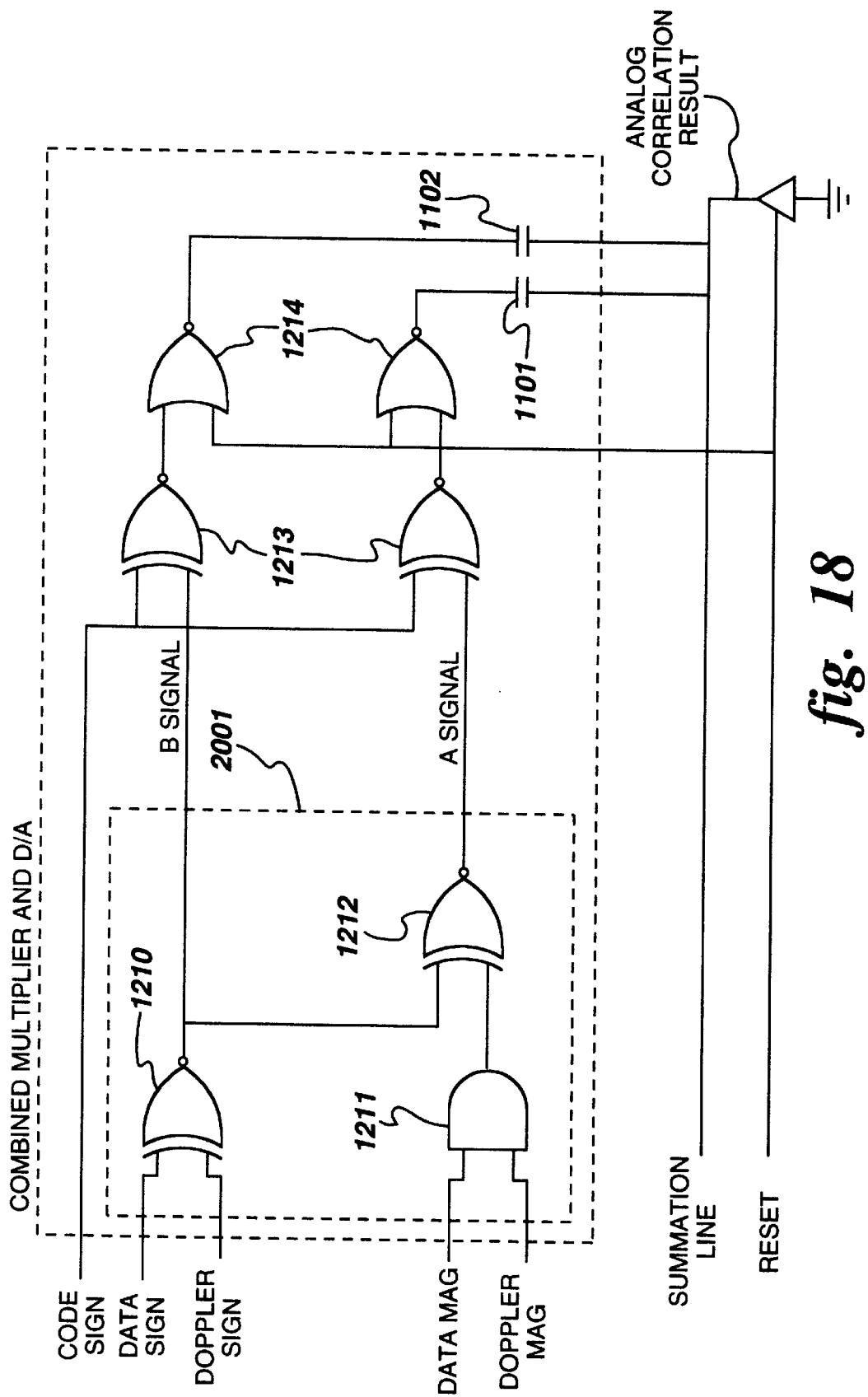
FIG. 18 is a schematic diagram of a three-sequence multiplier digital-to-analog converter cell.

D/A converters 1300, shown in FIGS. 9 and 12, utilize series switches to control charging of the charge summation capacitors. An alternative embodiment for the multiplier and analog converter (D/A) is shown for the three-sequence case in FIG. 18. An advantage of this embodiment is that digital logic functions directly drive the charge-summation capacitors and a series connection of switches is not needed. This multiplier-D/A combination is readily implemented in a standard digital CMOS process. Capacitors 1101 and 1102 are of substantially the same value and together provide for a three-level D/A conversion, e.g., −1, 0, and +1. The −1 level is invoked by driving both capacitors low (digital ground), the +1 level is invoked by driving both capacitors high (digital Vdd), and the 0 level is invoked by driving one capacitor high while driving the other low. In a multiplier 2001, exclusive NOR gate 1210 and AND gate 1211 multiply the two-bit data and Doppler values to form the sign-magnitude product. Exclusive NOR gate 1212 then converts the two-bit product to A and B signals that drive the two capacitors in either the same or different directions. Finally, exclusive NOR gates 1213 multiply the A and B signals by the binary code value, while NOR gates 1214 provide for grounding the capacitors so as to discharge them during the reset phase.

For a given length of stored GPS signal, a tradeoff exists between the length of coherent and non-coherent processing. As the coherent correlation length is increased, the SNR of each coherent processing result is increased but the number of coherent processing results available for squaring and non-coherent accumulation (integration) decreases. It is known by those skilled in the art that the SNR improves by 10 dB per decade of coherent processing length increase, but increases by only about 5 dB per decade of non-coherent processing length. Thus, for a given memory data length, the pre-detection SNR is maximized by performing one long coherent correlation. However, unpredicted receiver motion or local oscillator jitter will limit the feasible length of coherent processing. Also, as the coherent correlation length is increased, the bandwidth of the Doppler bins is reduced and this yields more Doppler bins that must be searched. The architectures of FIGS. 4 and 5 readily allow dynamic trading of coherent and non-coherent processing length through control of the replica generator, resetting of the coherent and non-coherent accumulators, and bypassing of the squaring functions.

It is usually true that the pre-detection SNR needed for reliable detection is lower than the SNR needed for accurate correlation peak localization (i.e., interpolation). Thus the acquisition time and energy can be minimized by using shorter coherent correlations (and thus searching over fewer Doppler bins that are as wide as the detection reliability constraints will allow) until a correlation detection is observed, and then reprocessing the data with longer coherent correlation using code offsets and Doppler shifts near the values that yielded the detection event, to increase the SNR and perform superior code offset interpolation. The architectures of FIGS. 4 and 5 readily allow this two step process.

Figure 14:
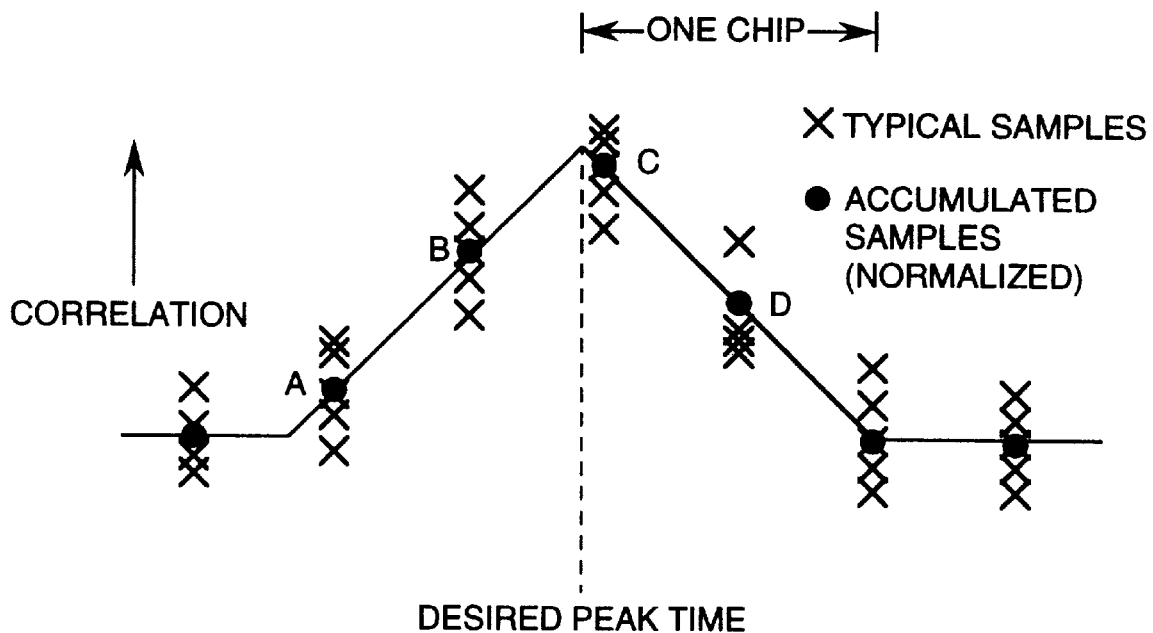
FIG. 14 is a graph showing the noiseless and noisy auto-correlation waveform for a short section of the 1.0 ms C/A-code P/N sequence near the correlation peak.

FIG. 14 shows a section of the noiseless auto-correlation waveform for a 1.0 ms C/A-code P/N waveform (not sampled). The auto-correlation value is very near zero for all offsets of magnitude greater than one chip width and is a triangle function (of the offset) for offsets between −1 and +1 chip width. In another aspect of the invention, accurate sub-chip correlation-peak time estimation is achieved without using sampling rates that are substantially higher than twice the C/A chip rate by using a sampling rate that is a non-integer multiple of the C/A chip rate. With an integer number N of samples per C/A code chip, the discrete-time auto-correlation sample value remains substantially constant over an input-signal time offset variation of 1/N of a C/A code chip period when the receiver bandwidth is substantially wider than the GPS signal bandwidth. This is a form of quantization and yields substantial quantization error if N is not large. For example, an offset measurement accuracy of one-tenth of a C/A code chip would require a sampling rate of N=10 times the C/A code chip rate. With a more-limited receiver bandwidth, the auto-correlation sample value varies with input-signal time offset, but not necessarily linearly with input offset. If a non-integer multiple sampling rate is used, then the sample instants precess or roll in chip-relative position as a sequence of signal C/A code chips is sampled. This precession allows the calculated auto-correlation value to change substantially linearly with input-signal time shift, and with much smaller time shifts. Although the above discussion has focused on the auto-correlation of the binary C/A code, the sample precession method is applicable to multiple-level signals in general.

With a replica code index and Doppler frequency that matches that of a noisy input signal, the serial or parallel correlator will calculate noisy samples of the shown auto-correlation function. By choosing the signal sampling rate so that there is an integer number of samples (e.g., 2183) per 1.0 ms C/A code period, correlation results from, for example, twenty consecutive 1.0 ms data memory sequences (using the same replica code offset) will yield twenty noisy samples of the same point on the C/A-code auto-correlation waveform. During signal acquisition, the replica Doppler frequency and phase rarely match that of the signal exactly so that squaring of the coherent correlation result is necessary to guarantee a positive correlation result. FIG. 14 also shows typical squared 1.0 ms coherent correlation sample points (x) calculated for several code offsets near that of the received signal, and with code index and Doppler frequency and phase that match that of the input signal. By averaging the squared samples from the same code offset, a lower-noise estimate of the corresponding auto-correlation value is generated. Typical averaged auto-correlation samples are also shown in the figure. This averaging is the so-called non-coherent accumulation. The phase of the sample grid, relative to the triangle function, depends on the phase of the received waveform relative to the input A/D sampling clock.

In the waveform of FIG. 14, the time of the auto-correlation peak is a parameter of interest, and this peak time is usually not on the sampling grid. However, using the averaged auto-correlation values surrounding the peak time, the peak time can be estimated by interpolation. Various interpolation methods are known to those skilled in the art, but one method involves ordering the averaged auto-correlation samples according to increasing code offset and then searching for the two largest adjacent entries. The left entry (the earlier one) and its left neighbor (points B and A respectively in the figure) together define a line, while the right entry and its right neighbor (points C and D respectively in the figure) together define another line. These two lines intersect somewhere between the two original end points (A and D in the figure) when the SNR is high enough, and the time associated with this intersection is the estimated correlation peak time. This method requires solution of two simultaneous equations, may be used with either the serial or parallel correlator methods, and would be computed by control 35 shown in FIG. 4 or FIG. 5.

Figure 15:
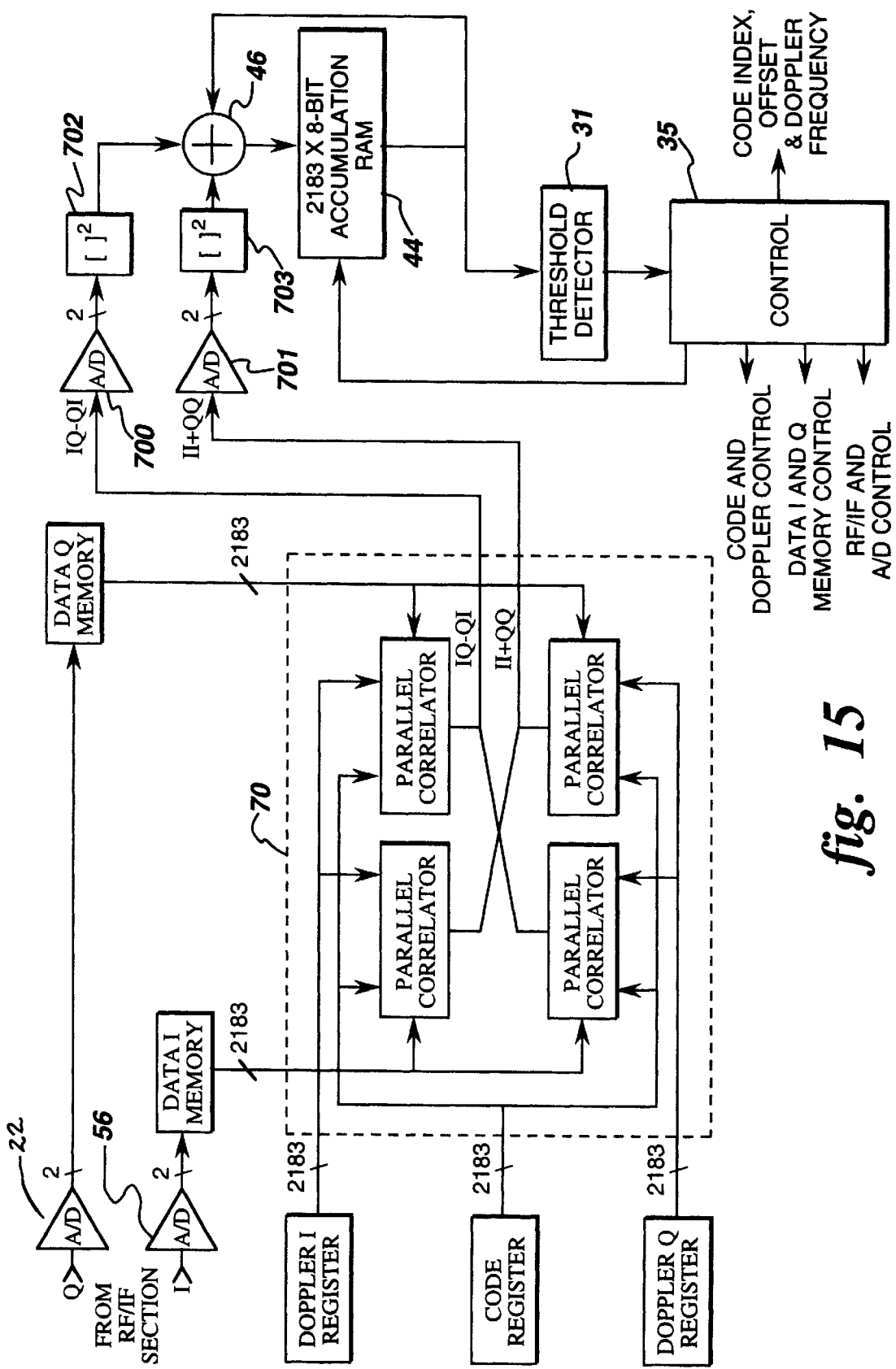
FIG. 15 is a block diagram showing a low-power parallel-correlator based acquisition system with full I/Q processing in which the RF/IF section generates two quadrature outputs.

FIG. 15 shows a low-power parallel-correlator based acquisition system with full I/Q processing in which the RF/IF section (not shown) generates two quadrature output signals which are passed to input AND converters 22 and 56. Control 35 applies power to the RF/IF section and to input A/D converters 700 and 701. A/D converter 56 generates sampled I data which is stored in the data I memory, while AND converter 22 generates sampled Q data which is stored in the data Q memory.

In one embodiment of the system, the input A/D converters sample the I and Q input signals periodically at approximately 2.183 million samples per second, yielding 2183 samples per C/A code cycle and approximately 2.1 samples per C/A code chip. The samples are quantized to 3 levels and use two-bit sign-magnitude representation, as described earlier. The I and Q data-storage memories are each large enough to store the entire data segment needed for signal acquisition. For nonmilitary utilization, this is usually 20 ms. After 20 ms (2183×20 samples) of I and Q data have been stored, power is removed from the RF/IF section and from the input A/D converters, and acquisition processing is begun. The I and Q data memories are each organized as twenty rows of 2183 two-bit samples, with 2183 simultaneous outputs (one full row). Four separate three-sequence parallel correlators are used, labeled II, IQ, QI, and QQ. Together these comprise a complex parallel correlator 70. The parallel correlators each use sequence lengths of 2183 samples. The I data memory drives the II and IQ correlators, while the Q data memory drives the QI and QQ correlators. Also, the I Doppler register drives the II and QI correlators while the Q Doppler register drives the IQ and QQ correlators. The order of data processing is set so that all desired replica code offsets are examined for a given replica code index and Doppler frequency before the code index or Doppler frequency is changed. Furthermore, all desired code offsets are processed for a given row of stored I and Q data before the row is changed. This will most likely minimize the combined memory reading and code-register shifting energy use. Other memory-row, code-index, and Doppler frequency processing orders are also possible, and the order can be chosen to minimize energy consumption. The II and QQ coherent processing results are summed to form II+QQ by connecting the associated summation lines, and the QI and IQ coherent processing results are summed by connecting their associated summation lines. For proper I-Q processing, either the QI or the IQ result must be inverted, and this can be accomplished by, for example, reversing the sense of all sign switches in all analog converters of the chosen parallel correlator. In this embodiment, IQ−QI is formed.

With GPS signals, the SNR of each II+QQ and IQ−QI signal is typically 0 to 4 dB. These signals are adequately represented with only a few levels (e.g., −1, 0, 1) and are converted to digital form by A/D converters 700 and 701, and then separately squared by squarers 702 and 703. The squared signals are summed by digital adder 46 and stored in accumulator 44. Accumulator 44 has a separate storage position associated with each candidate code offset, and correlation results for each code offset with different received data segments are accumulated in the associated storage position.

Figure 16:
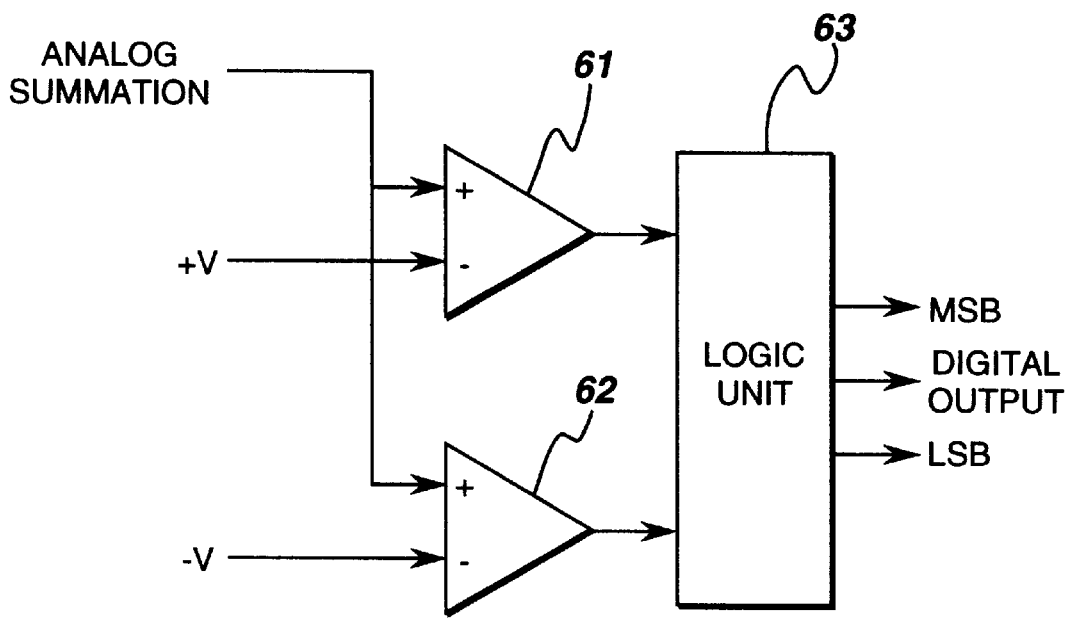
FIG. 16 is a block diagram of one embodiment of a squaring A/D converter.

FIG. 16 shows one embodiment of a squaring flash A/D converter that combines the A/D and squaring functions. Here two comparators 61 and 62 determine if the analog value is above, below, or between the two threshold values associated with analog representation levels −1, 0, +1. A logic unit 63 then maps the comparators' joint output state to the appropriate squared digital value. If desired, this squaring flash converter is readily generalized to more than three representation levels by adding more comparators and threshold voltages.

Figure 19:
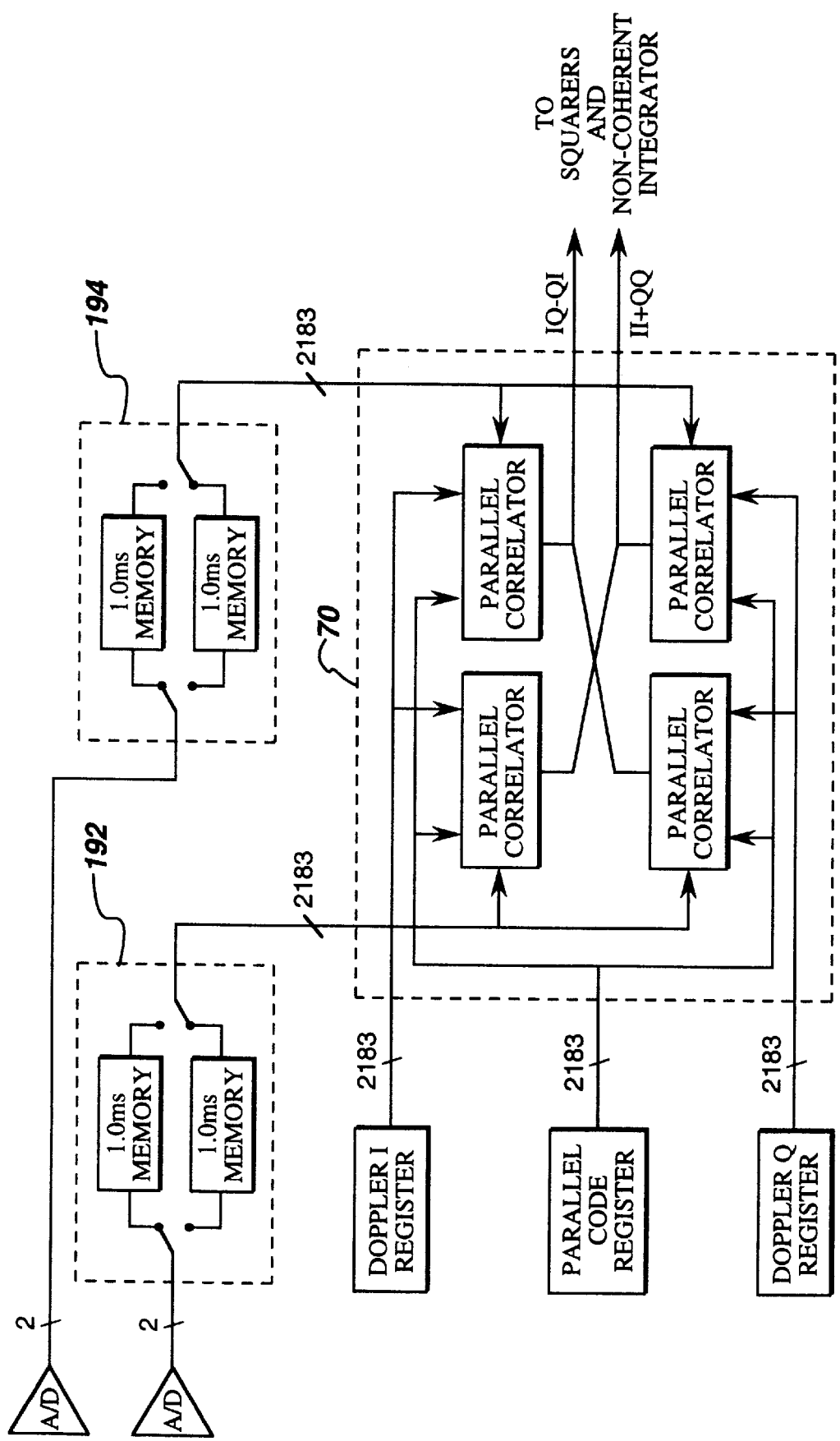
FIG. 19 is a schematic diagram of a Ping-Pong data-memory organization.

The sampling rates, stored sequence lengths, and simultaneous memory outputs lengths can be chosen to best fit the GPS application. For example, by storing the entire data segment needed for signal acquisition, the RF/IF section can be turned off after the shortest possible time (commensurate with receiving the needed data segment). The stored data set can then be used for the processing of all SCD bins in the acquisition search. Alternatively, a shorter memory can be used at the expense of having to keep the RF/IF section on for a longer time. For example, another attractive embodiment uses a "Ping-Pong" memory organization and is illustrated in FIG. 19. Here, the I and Q data-storage memories 192 and 194, respectively, are each only 2.0 ms long and are organized as two parallel-output 1.0 ms rows (e.g., 2183 samples in each row, as before). In both the I and Q data channels, one data row is accessed in parallel, for parallel correlation, while the other data row is being written with digitized data arriving from the RF/IF section. The entire I and Q data sequence lengths are each processed in 1.0 ms segments. The entire 20 ms data set is then processed for a single SCD bin in approximately 20 ms. Because the entire data sequence was not stored, the RF/IF section must be energized and produce another entire sequence if another SCD bin is to be tested. On the average, this increases the time that the RF/IF section must be kept energized during signal acquisition. However, the reduction in memory size can be dramatic. In some applications (e.g., military receivers under severe jamming conditions), the GPS SNR is very low and the data sequence length needed for acquisition may be so long that storage of the entire sequence is impractical. Under such circumstances, the Ping-Pong acquisition architecture is advantageous.

In some applications it will be advantageous to further reduce the size of the data-storage memories. With the two-segment (Ping-Pong) memory organization, a long continuous stream of receiver-output data can be processed. At the expense of a longer time to acquisition, the two-segment I and Q data memories 192 and 194 (FIG. 19) can be reduced to single-segment memories by eliminating one of the 1.0 ms sections from each memory. With this reduction, time-adjacent 1.0 ms receiver-output segments are not processed. Instead, only every other 1.0 ms segment is captured in memory and processed, and this lengthens the time elapsed for processing a given number of received signal segments.

To further reduce the memory size and the complexity of the parallel correlator, the length of the parallel correlator and the associated registers and memory segments can all be made smaller than the desired coherent processing length. The desired coherent processing length can be achieved by processing multiple shorter data segments and coherently combining their results. For example, a 1.0 ms coherent processing length can be achieved by using a single 0.5 ms long parallel correlator on two adjacent 0.5 ms data segments and adding their results digitally, after A/D conversion. Various combinations of correlator length, coherent processing length, numbers of memory segments, and code-offset search width are possible.

When the cost, size, and power dissipation of a standard serial-input serial-output (SISO) memory are sufficiently low, it may be advantageous to store the entire necessary I and Q data sequences in such memory, turn off the RF/IF receiver section, and use this memory in combination with the Ping-Pong or single-segment memory architectures to examine all desired SCD bins. The entire I and Q data sequences are read from the SISO memory once for each SCD bin tested, and this reading process will consume energy. However, because the RF/IF section is turned off, the system energy use will be reduced if the power dissipation of a SISO memory is sufficiently low relative to that of the RF/IF receiver section. Other stored sequence lengths, simultaneous memory output lengths, and sampling rates are also attractive.

Figure 20:
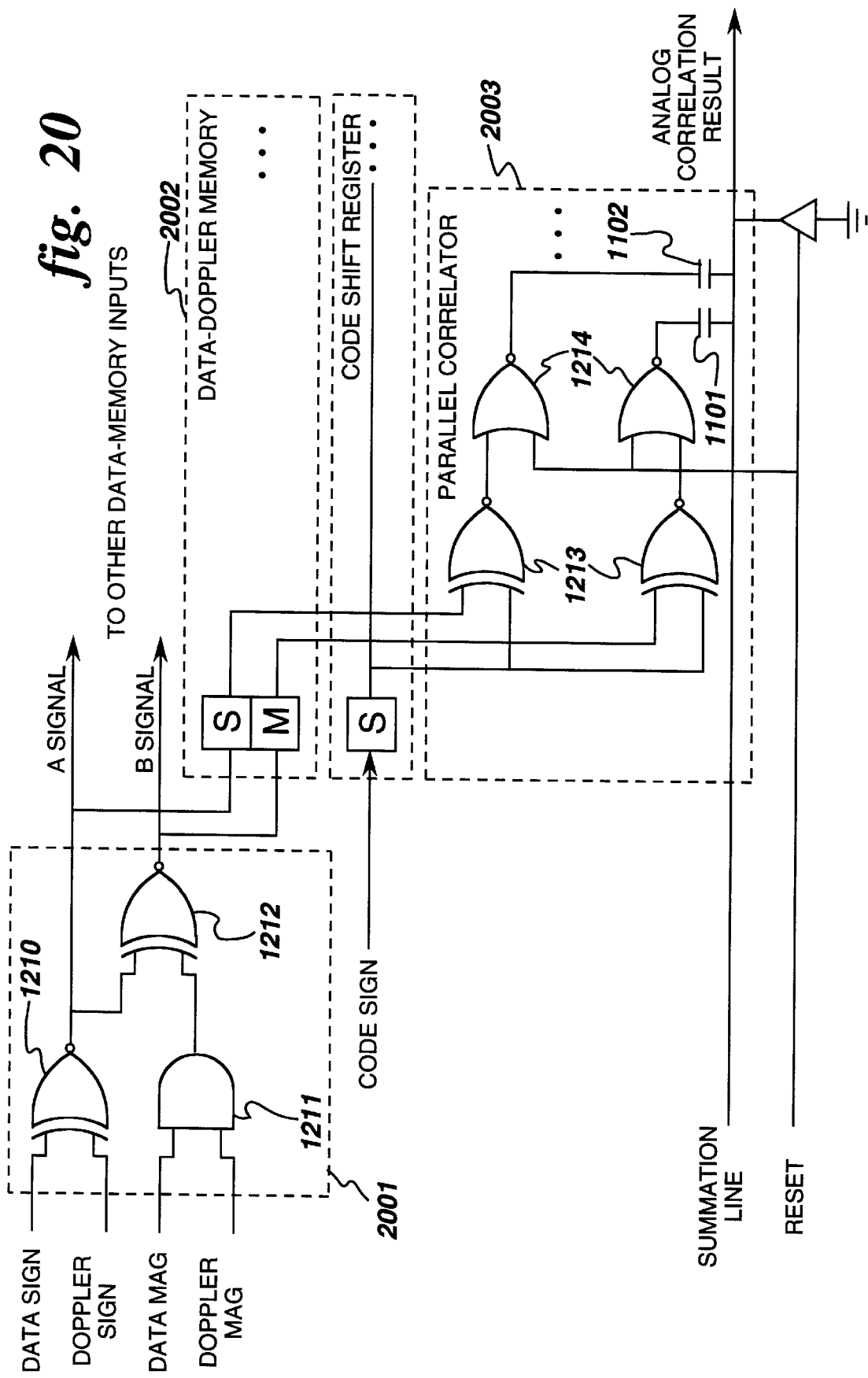
FIG. 20 is a schematic diagram of a parallel correlator with data-Doppler pre-multiplication.

In the two-sequence or three-sequence parallel correlator embodiments of FIGS. 8 and 11, the product of associated data and replica samples is performed in parallel within the correlator. This allows different Doppler bins to be tested for acquisition without having to collect new received data. FIG. 20 shows an alternative embodiment of one stage of a parallel correlator and the associated parallel memory where the data and Doppler samples are multiplied together by multiplier 2001 prior to storage in the parallel memory 2002. This is advantageous because the multipliers in the parallel correlator are thus simplified. Each correlator multiplier now multiplies its associated stored sample by just a single associated code bit. The combined multiplier and D/A converter for this correlator embodiment is similar to that shown in FIG. 18, except that the data-Doppler multiplier and A-B signal converter, comprised of exclusive NOR gates 1210 and 1212 and AND gate 1211, is moved out of the correlator and ahead of the data memory. The disconnected inputs to exclusive NOR gates 1213 are coupled to the data memory outputs. With this embodiment, new data must be stored if a different Doppler bin is to be tested for acquisition, but this is not a disadvantage in some applications.

Figure 21:
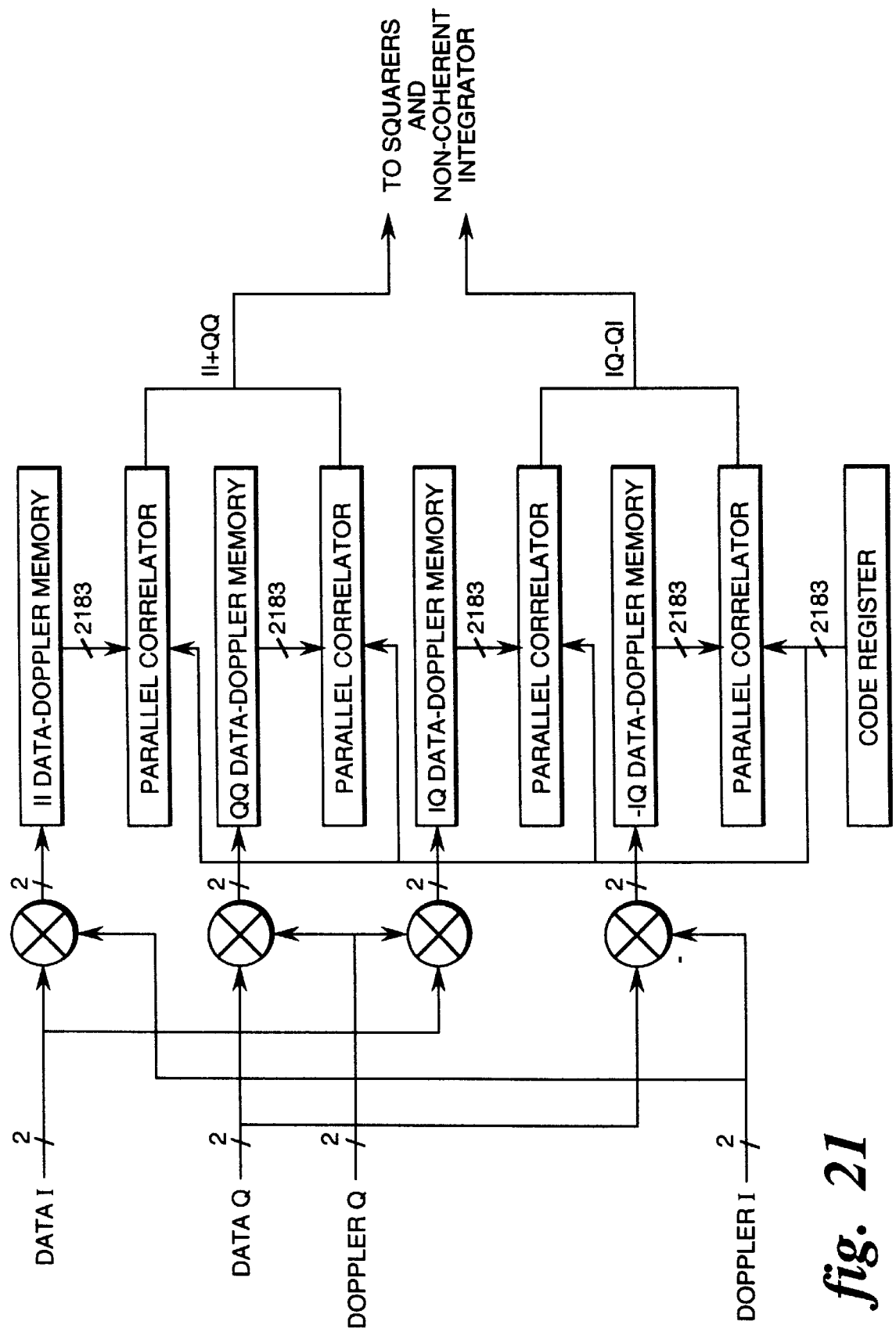
FIG. 21 is a block diagram of a full I-Q processor with data-Doppler pre-multiplication.

The combined parallel correlator and parallel memory shown in FIG. 20 can be advantageously used to form a simplified full I-Q processing GPS acquisition engine. In the full I-Q acquisition engine shown in FIG. 19, there are four separate parallel correlators coupled to data I and Q and Doppler I and Q registers (parallel memory), as well as to the parallel code register. An alternative full I-Q embodiment that uses the simpler correlator and memory organization of FIG. 20 is shown in FIG. 21. In this embodiment, the four parallel data-Doppler memories hold the II, QQ, IQ and QI data-Doppler product sequences, respectively. Each parallel memory can be organized as a Ping-Pong or single-segment memory, as described earlier. There is no separate data and Doppler storage. Each parallel memory connects to an associated parallel correlator, and each parallel correlator also connects to the single parallel code register. The reduced interconnection between memory sections and correlator sections allows this full I-Q processor embodiment to have a simpler (i.e., smaller and less costly) integrated-circuit implementation.

Figure 22:
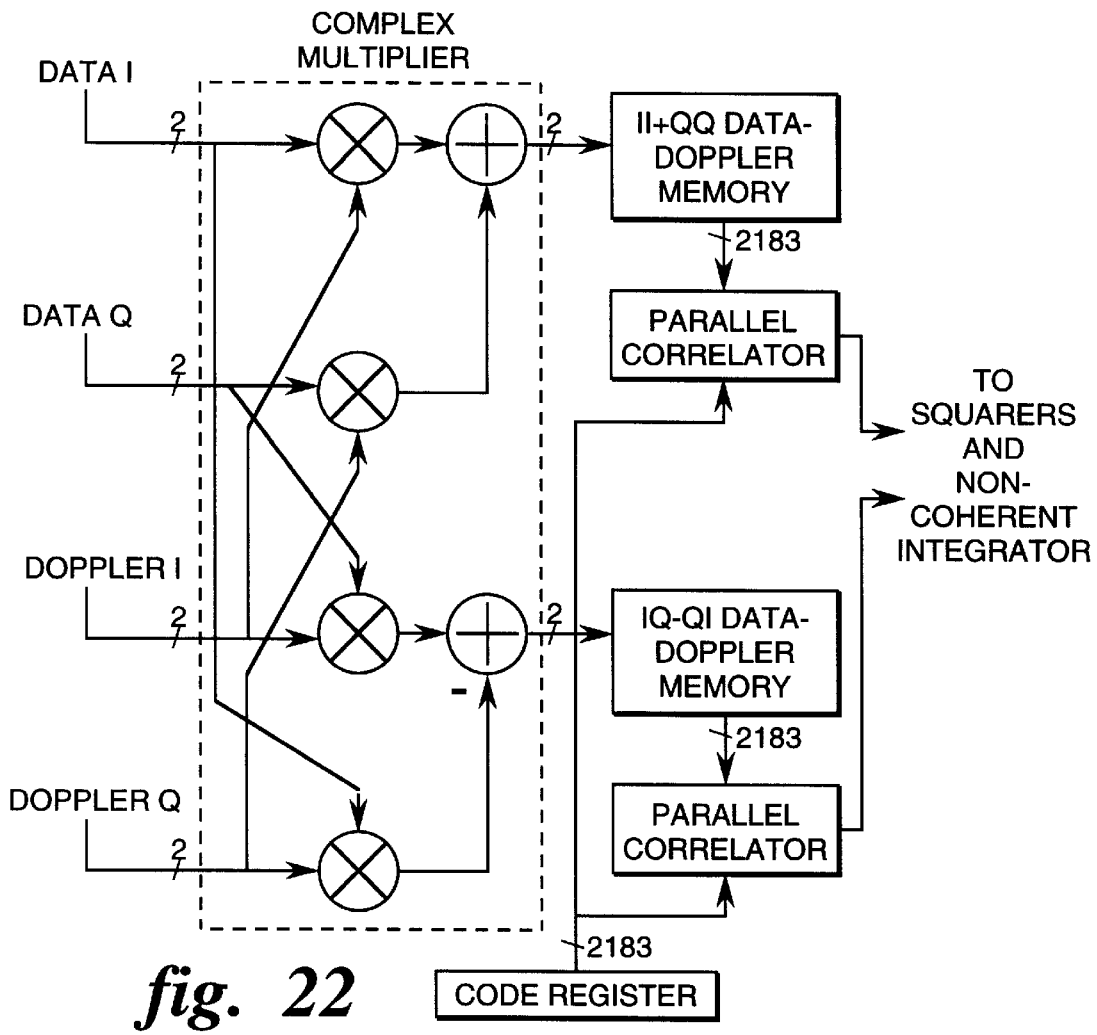
FIG. 22 is a block diagram of a full I-Q processor with data-Doppler complex pre-multiplication.

The complexity of the embodiment of FIG. 21 can be still further reduced by performing the II+QQ addition and the QI−IQ subtraction before data storage. Prior to storage, the addition and subtraction output signals can often be rounded or truncated to two bits with little SNR degradation. Then, as shown in FIG. 22, only two data-Doppler memories (one for II+QQ data, the other for QI−IQ data), two parallel correlators, and one code register are needed. Each data-Doppler memory can be organized as a Ping-Pong or single-segment memory, as described earlier. Other organizations of the parallel correlator, parallel memory, and the sequence multiplications are also possible and advantageous.

Figure 17:
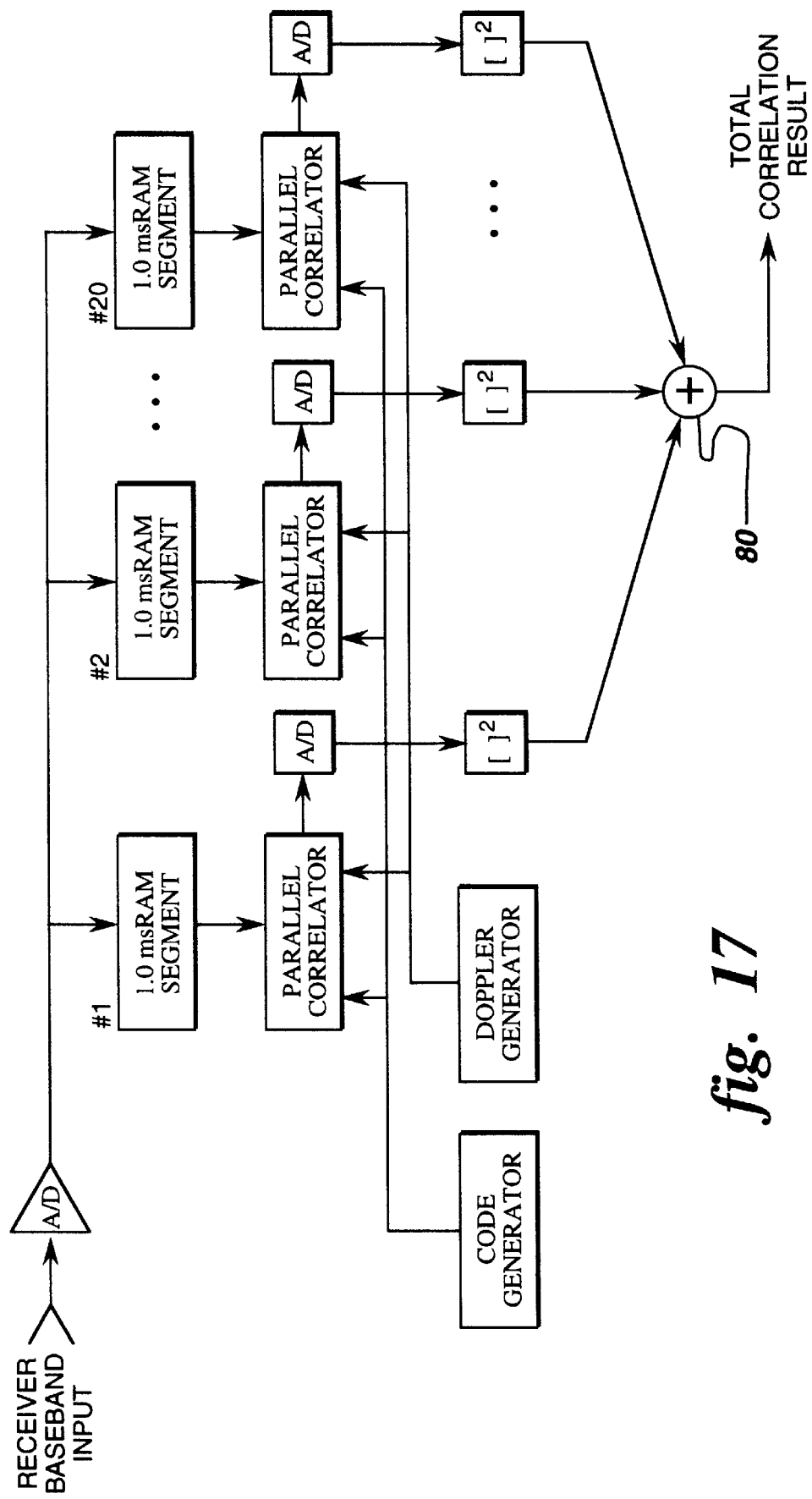
FIG. 17 is a block diagram of a combined data-memory, replica-generation, parallel-correlator organization that reduces the number of code register shifts per code/Doppler combination.

FIG. 17 shows a combined data-memory, replica-generation, parallel-correlator organization (for just the II correlation process) that reduces the number of code register shifts to 2183 shifts per code/Doppler combination and eliminates need for any non-coherent accumulation RAM. The trade-off is that the input memory must now be segmented to allow all stored data to be simultaneously accessed. These data are applied, in 1.0 ms blocks, to separate parallel correlators. These parallel correlators are all driven by the same code and Doppler replicas, and they simultaneously (in one full code cycle) generate the twenty separate 1.0 ms correlation sequences that were previously accumulated time sequentially. Separate squaring A/D converters convert the analog correlation sequences to digital form where an adder tree 80 forms the accumulated correlation sequence. The accumulation RAM can be completely avoided by performing the peak search and interpolation process on the accumulated correlation sequence as it is being generated. In this arrangement, the code and Doppler registers now drive twenty loads where they previously drove one, which may negate some of the energy reduction.

Figure 23:
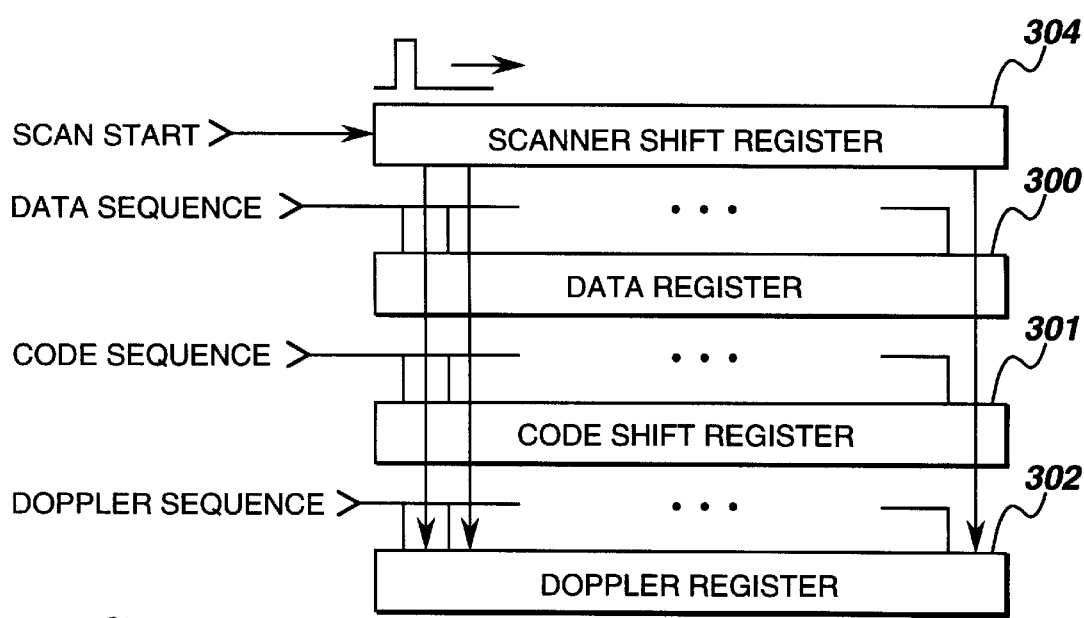
FIG. 23 is a block diagram of the low-energy register writing method using a scanner shift register.

When the parallel correlator is used with data and replica registers for the two-sequence case, or with data, Doppler, and code registers for the three-sequence case, it is advantageous to minimize the energy used in loading (writing) the various registers. In another aspect of the present invention, loading of the various registers is made a low energy operation by using a scanner shift register to determine which data, Doppler, and code register stages are to be written at each instant. FIG. 23 shows a scanner shift register 304 in combination with the data register 300, Doppler register 301, and code register 302 for the three-sequence case. In one method of operation, samples arrive sequentially for each of the digital data, Doppler, and code sequences and the sample rates are the same. As the samples for each respective sequence arrive, they are written into corresponding sequential locations in their respective registers. In synchronism with the arriving samples, a single logical 1 is shifted along the binary scanner register, enabling the writing of the arriving samples into corresponding sequential locations of the respective registers. The writing operation is very low energy because only two adjacent scanner register locations change their stored value at each shift, and none of the respective registers is shifting during the writing operation.

While the disclosed invention is applicable to GPS C/A signal acquisition, it can also be used to dramatically reduce both the time and energy required to directly acquire the P(Y) military GPS signals without first acquiring the C/A signals. By altering the satellite-code generator component of the code/Doppler generator in FIGS. 4 or 5 to generate the P(Y) code instead of the C/A code, the methods and architectures disclosed herein become applicable to the P(Y) case.

While only certain preferred features of the invention have been illustrated and described, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letter Patent is as follows:

1. A direct sequence spread spectrum (DSSS) signal processing architecture including a receiver for receiving at least a time segment of code division multiple access (CDMA) signals that is sufficient to allow high-reliability acquisition of the signals, said architecture comprising:

a memory for storing receiver output data collected over said time segment;

means for turning off the receiver after said receiver output data has been stored in said memory;

means for reading said data from said memory;

a code/Doppler generator for providing a segment of a replica signal;

a correlator for measuring correlation between the replica segment and a segment of the receiver output data, said correlator being responsive to said receiver output data segment read from said memory and to said replica segment;

detection means responsive to said correlator for detecting a predetermined correlation level; and sampling means for sampling receiver output baseband data at a non-integer oversampling rate so as to produce a sampling roll whereby an accurate correlation peak is obtained with minimal memory and a minimal sampling rate.

2. A direct sequence spread spectrum (DSSS) signal processing architecture including a receiver for receiving code division multiple access (CDMA) signals, said architecture comprising:

memory, means for storing a segment of receiver output data;

means for reading said data from said memory means;

a code/Doppler generator for providing a segment of a replica signal, said signal being defined in part by a replica code, code offset and Doppler frequency;

a parallel correlator for measuring correlation between said replica signal segment and a segment of the receiver output data, said correlator being responsive to said receiver output data segment read from said memory means and to said replica signal segment, said means for reading data from said memory means being adapted to deliver a segment of multiple data samples simultaneously to said correlator, and said code/Doppler generator being adapted to deliver a segment of multiple replica signal samples simultaneously to said correlator; and detection means responsive to said correlator for determining a predetermined correlation level.

3. The DSSS signal processing architecture of claim 2 including means for changing the replica signal segment, wherein said detection means is adapted to determine the replica signal segment that yields highest correlation with the receiver output data.

4. The DSSS signal processing architecture of claim 2 including means for shifting one of said segment of replica signal and said data read from said memory means, relative to the other.

5. The DSSS signal processing architecture of claim 2 including means for turning off the receiver after said receiver output data has been stored in said memory.

6. The DSSS signal processing architecture of claim 2 wherein said memory means comprises elements to accept digital signal data written sequentially therein and to provide massively parallel output of data such that a sequence of data of predetermined length is available at the output of said memory means simultaneously, said code/Doppler generator further including a replica shift register comprising elements organized for massively parallel output of data having a data sequence length equal to the data sequence length provided by said memory means.

7. The DSSS signal processing architecture of claim 2 wherein said memory means comprises elements organized to accept digital data written sequentially therein and to provide massively parallel output of data such that a sequence of data of predetermined length is available at the output of said memory means simultaneously, said code/Doppler generator further including a Doppler register and a code register, said Doppler register and said code register comprising elements organized for massively parallel output of data having a data sequence length equal to the data sequence length provided by said memory means.

8. The DSSS signal processing architecture of claim 2 wherein said code/Doppler generator is adapted to program the generated segment of replica signal samples for different Doppler frequencies.

9. The DSSS signal processing architecture of claim 2 wherein the code/Doppler generator comprises:

replica register means for storing said replica segment and adapted to provide as an output signal said segment of multiple replica samples simultaneously.

10. The DSSS signal, processing architecture of claim 2 wherein the code/Doppler generator comprises:

a code replica register for storing a specific pseudo-random noise (P/N) code; and a Doppler-replica register for storing a sampled digital representation of a properly phased sinusoid corresponding to a frequency bin under examination;

said replica code and said Doppler frequency within said replica signal segment being of equal sample length for presentation in parallel to said parallel correlator.

11. The DSSS signal processing architecture of claim 2 wherein the parallel correlator comprises:

an array of multipliers for developing products of samples of said data segment from said receiver output data memory means with corresponding samples of said replica segment; and an analog summer for adding the output signals of said multipliers simultaneously.

12. The DSSS signal processing architecture of claim 10 wherein the parallel correlator comprises:

an array of multipliers for developing products of samples of said data segment from said receiver output data memory means with corresponding samples of said digital representation of said properly phased sinusoid and corresponding samples of said specific P/N code in said code replica register;

an array of digital-to-analog converters coupled to said array of multipliers for converting output signals from said array of multipliers to analog form; and an analog adder for adding the output signals of said digital-to-analog converters simultaneously.

13. The DSSS signal processing architecture of claim 11 wherein each multiplier in said multiplier array is adapted to produce digital representations of the developed products, and wherein the analog summer comprises:

an array of digital-to-analog converters with each respective digital-to-analog converter coupled to a respective multiplier in said multiplier array; and an analog adder for summing the output signals of said digital-to-analog converters simultaneously.

14. The DSSS signal processing architecture of claim 13 wherein each of said digital-to-analog converters comprises:

a plurality of capacitors for storing values of charge corresponding to the associated digital representation of a developed product; and a plurality of switches, each respective one of said switches being adapted to supply to one side of a corresponding one of said capacitors a selected one of a positive voltage, negative voltage, and reference voltage in response to a three level bipolar digital representation of said developed product, the other side of each of said capacitors being coupled to a charge summation line common to all digital-to-analog converters in the array and comprising the analog adder.

15. The DSSS signal processing architecture of claim 14 wherein each of the capacitors is of substantially identical capacitance value.

16. The DSSS signal processing architecture of claim 14 wherein the multiplier array and digital-to-analog converter array are each differential, and wherein the analog adder is differential and adapted to generate both positive and negative summation results.

17. The DSSS signal processing architecture of claim 12 wherein each multiplier in said multiplier array is adapted to produce digital representations of the developed products and wherein the analog summer comprises:

an array of digital-to-analog converters with each respective digital-to-analog converter coupled to a respective multiplier in said multiplier array; and an analog adder for summing the output signals of said digital-to-analog converters simultaneously.

18. The DSSS signal processing architecture of claim 2 including sampling means for sampling receiver output data at a non-integer oversampling rate so as to produce a sampling roll whereby an accurate correlation peak is obtained with minimal memory and register length.

* * * * *